US012628166B2

(12) United States Patent
Yeo et al.

(10) Patent No.: US 12,628,166 B2
(45) Date of Patent: May 12, 2026

(54) METHOD AND APPARATUS FOR TRANSMITTING/RECEIVING SIGNAL FOR GROUPCAST IN WIRELESS COMMUNICATION SYSTEM

(71) Applicant: SAMSUNG ELECTRONICS CO., LTD., Suwon-si (KR)

(72) Inventors: Jeongho Yeo, Suwon-si (KR); Youngbum Kim, Suwon-si (KR); Taehan Bae, Suwon-si (KR); Sungjin Park, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 18/040,785

(22) PCT Filed: Jul. 20, 2021

(86) PCT No.: PCT/KR2021/009303
§ 371 (c)(1),
(2) Date: Feb. 6, 2023

(87) PCT Pub. No.: WO2022/030813
PCT Pub. Date: Feb. 10, 2022

(65) Prior Publication Data
US 2023/0362932 A1 Nov. 9, 2023

(30) Foreign Application Priority Data
Aug. 5, 2020 (KR) ........................ 10-2020-0098234

(51) Int. Cl.
*H04W 72/20* (2023.01)
*H04L 1/1812* (2023.01)
*H04W 72/566* (2023.01)

(52) U.S. Cl.
CPC ........... *H04W 72/20* (2023.01); *H04L 1/1812* (2013.01); *H04W 72/566* (2023.01)

(58) Field of Classification Search
CPC ... H04W 72/20; H04W 72/30; H04W 72/566; H04L 1/1864; H04L 5/0053;
(Continued)

(56) References Cited

U.S. PATENT DOCUMENTS

2010/0110960 A1 5/2010 Kim et al.
2013/0223323 A1 8/2013 Jang et al.
(Continued)

FOREIGN PATENT DOCUMENTS

CN 109644325 A 4/2019
CN 110463108 A 11/2019
(Continued)

OTHER PUBLICATIONS

Supplementary European Search Report dated Jan. 29, 2024, in connection with European Patent Application No. 21853990.6, 8 pages.
(Continued)

*Primary Examiner* — Awet Haile

(57) ABSTRACT

The present disclosure relates to a 5G or 6G communication system for supporting a higher data transmission rate than a 4G communication system such as LTE. According to various embodiments of the present disclosure, a method performed by a transmission apparatus in a wireless communication system may be provided. The method may comprise the steps of: transmitting, via a physical downlink control channel (PDCCH), first control information for scheduling a group common-physical downlink shared channel (GC-PDSCH) via which multicast data is transmitted, including information related to hybrid automatic repeat request (HARQ) feedback for the multicast data; and trans-
(Continued)

mitting, via the PDCCH, second control information for scheduling a physical downlink shared channel (PDSCH) via which unicast data is transmitted, including information related to HARQ feedback for the unicast data.

20 Claims, 13 Drawing Sheets

(58) Field of Classification Search
CPC ... H04L 1/0031; H04L 1/0061; H04L 1/1812; H04L 1/1822; H04L 1/1825; H04L 1/1854; H04L 1/1887; H04L 1/1896; H04L 5/0007; H04L 5/0044; H04L 5/005; H04L 5/0051; H04L 5/0055; H04L 2001/0093; Y02D 30/70
See application file for complete search history.

(56) References Cited

U.S. PATENT DOCUMENTS

| | | | |
|---|---|---|---|
| 2013/0315124 A1 | 11/2013 | Rapaport et al. | |
| 2018/0212717 A1 | 7/2018 | Yang et al. | |
| 2018/0234807 A1 | 8/2018 | Park et al. | |
| 2019/0208570 A1 | 7/2019 | Shrivastava et al. | |
| 2020/0015206 A1 | 1/2020 | Lee | |
| 2020/0099476 A1 | 3/2020 | Park | |
| 2020/0100048 A1 | 3/2020 | Wu et al. | |
| 2020/0106566 A1 | 4/2020 | Yeo et al. | |
| 2020/0213981 A1 | 7/2020 | Park et al. | |
| 2020/0220669 A1 | 7/2020 | Park | |
| 2020/0229145 A1 | 7/2020 | Kang et al. | |
| 2021/0111835 A1* | 4/2021 | Khoshnevisan | H04W 72/02 |
| 2021/0160014 A1* | 5/2021 | Selvanesan | H04W 76/27 |
| 2021/0345364 A1* | 11/2021 | Zhang | H04W 72/56 |
| 2022/0109527 A1 | 4/2022 | Hwang et al. | |
| 2022/0322133 A1 | 10/2022 | Zhao | |
| 2022/0377761 A1* | 11/2022 | Lee | H04W 92/18 |
| 2023/0082566 A1 | 3/2023 | Yin et al. | |
| 2023/0133506 A1* | 5/2023 | Wang | H04L 5/0055 |
| 2023/0239170 A1* | 7/2023 | Fan | H04L 5/0055 370/329 |

FOREIGN PATENT DOCUMENTS

| | | |
|---|---|---|
| CN | 110892775 A | 3/2020 |
| CN | 111342939 A | 6/2020 |
| CN | 111416700 A | 7/2020 |
| KR | 10-2019-0010741 A | 1/2019 |
| KR | 20200034603 A | 3/2020 |
| KR | 10-2020-0036725 A | 4/2020 |
| KR | 10-2020-0086920 A | 7/2020 |
| TW | 202015434 A | 4/2020 |
| WO | 2017043916 A1 | 3/2017 |
| WO | 2020/030703 A1 | 2/2020 |
| WO | 2020/068973 A1 | 4/2020 |
| WO | 2020153721 A1 | 7/2020 |
| WO | WO-2021073727 A1 * | 4/2021 .......... H04W 52/242 |

OTHER PUBLICATIONS

Samsung "Discussion on Coexistence between LTE and NR PC5," 3GPP TSG RAN WG1 Meeting #95, Spokane, USA, Nov. 2018, R1-1812991, 3 pages.

Office Action issued Aug. 21, 2024, in connection with Chinese Patent Application No. 202180057213.6, 19 pages.

International Search Report and Written Opinion of the International Searching Authority dated Oct. 18, 2021, in connection with International Application No. PCT/KR2021/009303, 9 pages.

InterDigital Inc., "Discussion on Procedures Related to Non-Orthogonal Multiple Access," R1-1813213, 3GPP TSG RAN WG1 Meeting #95, Spokane, USA, Nov. 12-16, 2018, 5 pages.

Examination report issued May 8, 2025, in connection with European Patent Application No. 21 853 990.6 , 4 pages.

Office Action issued Apr. 30, 2025, in connection with Chinese Patent Application No. 202180057213.6, 23 pages.

Office Action issued Jun. 17, 2025, in connection with Japanese Patent Application No. 2023-507834, 11 pages.

Qualcomm Incorporated, "Physical layer procedures for sidelink," 3GPP TSG RAN WG1 Meeting #97 Reno, USA, May 2019, R1-1907274, 16 pages.

Office Action issued Feb. 5, 2025, in connection with Chinese Patent Application No. 202180057213.6, 21 pages.

LG Electronics, "Feature lead summary #2 for agenda item 7.2.4.5 Physical layer procedures for sidelink," 3GPP TSG RAN WG1 #96bis, R1-1905892, Xi''an, China, Apr. 2019, 23 pages.

Office Action issued Feb. 18, 2025, in connection with Japanese Patent Application No. 2023-507834, 6 pages.

Office Action issued Aug. 26, 2025, in connection with Indian Patent Application No. 202317009407, 6 pages.

Decision to Grant issued Jan. 29, 2026, in connection with Chinese Patent Application No. 202180057213.6, 7 pages.

Office Action issued Feb. 10, 2026, in connection with Indian Patent Application No. 202317009407, 2 pages.

* cited by examiner

METHOD AND APPARATUS FOR TRANSMITTING/RECEIVING SIGNAL FOR GROUPCAST IN WIRELESS COMMUNICATION SYSTEM

CROSS-REFERENCE TO RELATED APPLICATIONS

This application is a 371 of International Application No. PCT/KR2021/009303 filed on Jul. 20, 2021, which claims priority to Korean Patent Application No. 10-2020-0098234 filed on Aug. 5, 2020, the disclosures of which are herein incorporated by reference in their entirety.

BACKGROUND

1. Field

The disclosure relates to a wireless communication system, and more particularly, to a method and apparatus to transmit/receive a signal for groupcast and/or multicast.

2. Description of Related Art

Wireless communication technologies have been developed mainly for human services, such as voice, multimedia, and data communication. As 5th-generation (5G) communication systems are commercially available, connected devices are expected to explosively increase and to be connected to a communication network. Examples of things connected to a network may include vehicles, robots, drones, home appliances, displays, smart sensors installed in various infrastructures, construction machinery, and factory equipment. Mobile devices will evolve into various form factors, such as augmented reality glasses, virtual reality headsets, and hologram devices. In the 6th-generation (6G) era, efforts are being made to develop an enhanced 6G communication system to provide various services by connecting hundreds of billions of devices and things. For this reason, the 6G communication system is called a beyond 5G system.

In the 6G communication system expected to be realized around year 2030, the maximum transmission rate is tera (i.e., 1000 gigabit) bps, and the wireless latency is 100 microseconds (μsec). In other words, the transmission rate of the 6G communication system is 50 times faster than that of the 5G communication system, and the wireless latency is reduced to one tenth.

To achieve these high data rates and ultra-low latency, 6G communication systems are considered to be implemented in terahertz bands (e.g., 95 gigahertz (95 GHz) to 3 terahertz (3 THz) bands). As the path loss and atmospheric absorption issues worsen in the terahertz band as compared with millimeter wave (mmWave) introduced in 5G, technology that may guarantee signal reach, that is, coverage, would become more important. As major techniques for ensuring coverage, there need to be developed multi-antenna transmission techniques, such as new waveform, beamforming, massive multiple-input and multiple-output (MIMO), full dimensional MIMO (FD-MIMO), array antennas, or large-scale antennas, which exhibit better coverage characteristics than radio frequency (RF) devices and orthogonal frequency division multiplexing (OFDM). New technologies, such as a metamaterial-based lens and antennas, high-dimensional spatial multiplexing technology using an orbital angular momentum (OAM), and a reconfigurable intelligent surface (RIS), are being discussed to enhance the coverage of the terahertz band signals.

For 6G communication systems to enhance frequency efficiency and system network for 6G communication systems include full-duplex technology, there are being developed full-duplex technology in which uplink and downlink simultaneously utilize the same frequency resource at the same time, network technology that comprehensively use satellite and high-altitude platform stations (HAPSs), network architecture innovation technology that enables optimization and automation of network operation and supports mobile base stations, dynamic spectrum sharing technology through collision avoidance based on prediction of spectrum usages, artificial intelligence (AI)-based communication technology that uses AI from the stage of designing and internalizes end-to-end AI supporting function to thereby optimize the system, and next-generation distributed computing technology that realizes services that exceed the limitation of the UE computation capability by ultra-high performance communication and mobile edge computing (MEC) or clouds. Further, continuous attempts have been made to reinforce connectivity between device, further optimizing the network, prompting implementation of network entities in software, and increase the openness of wireless communication by the design of a new protocol to be used in 6G communication systems, implementation of a hardware-based security environment, development of a mechanism for safely using data, and development of technology for maintaining privacy.

Such research and development efforts for 6G communication systems would implement the next hyper-connected experience via hyper-connectivity of 6G communication systems which encompass human-thing connections as well as thing-to-thing connections. Specifically, the 6G communication system would be able to provide services, such as truly immersive extended reality (XR), high-fidelity mobile hologram, and digital replica. Further, services, such as remote surgery, industrial automation and emergency response would be provided through the 6G communication system thanks to enhanced security and reliability and would have various applications in medical, auto, or home appliance industries.

In a wireless communication system, a base station may provide a groupcast service and/or a multicast service by transmitting the same data to several terminals. At this time, if a groupcast service and/or a multicast service is provided to each terminal through separate data transmission/reception, inefficiency of a frequency resource and a time resource may result. Accordingly, there is a need for providing a method and apparatus for efficiently performing data transmission/reception to provide a groupcast service and/or a multicast service.

SUMMARY

An aspect of the disclosure is to provide a method and apparatus to transmit and receive a signal for groupcast and/or multicast in a wireless communication system.

Another aspect of the disclosure is to provide a method and apparatus to transmit/receive HARQ feedback information for data for groupcast and/or multicast in a wireless communication system.

Still another aspect of the disclosure is to provide a method and apparatus to transmit/receive a signal in consideration of a relationship between data for groupcast and/or multicast and data for unicast and/or broadcast in a wireless communication system.

Still another aspect of the disclosure is to provide a method and apparatus to process data of an RRC_connected terminal and transmit/receive HARQ feedback information upon receiving together data for groupcast and/or multicast and data for unicast and/or broadcast in a wireless communication system.

Still another aspect of the disclosure is to provide a method and apparatus in which an RRC_connected terminal receiving data for groupcast and/or multicast receives the data for groupcast and/or multicast according to its capability in a wireless communication system.

According to various embodiments of the disclosure, a method performed by a transmitting apparatus in a wireless communication system may be provided. The method may include: transmitting, via a physical downlink control channel (PDCCH), first control information which includes information related to hybrid automatic repeat request (HARQ) feedback for multicast data and schedules a group common-physical downlink shared channel (GC-PDSCH) via which the multicast data is transmitted; and transmitting, via the PDCCH, second control information which includes information related to HARQ feedback for unicast data and schedules a physical downlink shared channel (PDSCH) via which the unicast data is transmitted.

According to various embodiments of the disclosure, a method performed by a receiving apparatus in a wireless communication system may be provided. The method may include: receiving, via a physical downlink control channel (PDCCH), first control information which includes information related to hybrid automatic repeat request (HARQ) feedback for multicast data and schedules a group common-physical downlink shared channel (GC-PDSCH) via which the multicast data is transmitted and; and receiving, via the PDCCH, second control information which includes information related to HARQ feedback for unicast data and schedules a physical downlink shared channel (PDSCH) via which the unicast data is transmitted.

According to various embodiments of the disclosure, a transmitting apparatus in a wireless communication system may be provided. The apparatus may include: a transceiver; and at least one processor, and the at least one processor may be configured to: transmit, via the transceiver, first control information which includes information related to hybrid automatic repeat request (HARQ) feedback for multicast data and schedules a group common-physical downlink shared channel (GC-PDSCH) via which the multicast data is transmitted, via a physical downlink control channel (PDCCH), and transmit, via the transceiver, second control information which includes information related to HARQ feedback for unicast data and schedules a physical downlink shared channel (PDSCH) via which the unicast data is transmitted, via the PDCCH.

According to various embodiments of the disclosure, a receiving apparatus in a wireless communication system may be provided. The apparatus may include: a transceiver; and at least one processor, and the at least one processor may be configured to: receive, via the transceiver, first control information which includes information related to hybrid automatic repeat request (HARQ) feedback for multicast data and schedules a group common-physical downlink shared channel (GC-PDSCH) via which multicast data is transmitted and first control information to schedule a physical downlink control channel (PDCCH), via a physical downlink control channel (PDCCH), and receive, via the transceiver, second control information which includes information related to HARQ feedback for unicast data and schedules a physical downlink shared channel (PDSCH) via which unicast data is transmitted, via the PDCCH.

A method of a transmitting apparatus proposed in various embodiments of the disclosure includes: in a method of a transmitting apparatus in a wireless communication system, generating information related to whether to transmit hybrid automatic repeat request (HARQ) feedback information for groupcast data; generating information related to a priority for processing groupcast data and unicast data, and/or broadcast data; and transmitting at least one of the information related to whether to transmit the HARQ feedback information for the groupcast data and the information related to the priority for processing the groupcast data and the unicast data, and/or the broadcast data.

A method of a receiving apparatus proposed in various embodiments of the disclosure includes: in a method of a receiving apparatus in a wireless communication system, receiving a signal from a transmitting apparatus; and identifying, from the signal, at least one of information related to whether to transmit hybrid automatic repeat request (HARQ) feedback information for groupcast data and information related to a priority for processing groupcast data and unicast data, and/or broadcast data.

A transmitting apparatus proposed in various embodiments of the disclosure includes: in a transmitting apparatus in a wireless communication system, a transceiver for transmitting and receiving a signal; and a processor for generating information related to whether to transmit hybrid automatic repeat request (HARQ) feedback information for groupcast data, generating information related to a priority for processing groupcast data and unicast data, and/or broadcast data, and transmitting, via the transceiver, at least one of the information related to whether to transmit the HARQ feedback information for the groupcast data and the information related to the priority for processing the groupcast data and the unicast data, and/or the broadcast data.

A receiving apparatus proposed in various embodiments of the disclosure includes: in a receiving apparatus in a wireless communication system, a transceiver for receiving a signal from a transmitting apparatus; and a processor for identifying, from the signal, at least one of information related to whether to transmit hybrid automatic repeat request (HARQ) feedback information for groupcast data and information related to a priority for processing groupcast data and unicast data, and/or broadcast data.

An aspect of the disclosure has effect of making it possible to provide a method and apparatus to transmit and receive a signal for groupcast and/or multicast in a wireless communication system.

Another aspect of the disclosure has effect of making it possible to provide a method and apparatus to transmit/receive HARQ feedback information for data for groupcast and/or multicast in a wireless communication system.

Still another aspect of the disclosure has effect of making it possible to provide a method and apparatus to transmit/receive a signal in consideration of a relationship between data for groupcast and/or multicast and data for unicast and/or broadcast in a wireless communication system.

Still another aspect of the disclosure has effect of making it possible to provide a method and apparatus to process data of an RRC_connected terminal and transmit/receive HARQ feedback information upon receiving together data for groupcast and/or multicast and data for unicast and/or broadcast in a wireless communication system.

Still another aspect of the disclosure has effect of making it possible to provide a method and apparatus in which an RRC_connected terminal receiving data for groupcast and/or multicast receives the data for groupcast and/or multicast according to its capability in a wireless communication system.

BRIEF DESCRIPTION OF THE DRAWINGS

FIG. 7 is a diagram illustrating a symbol in which an SS/PBCH block may be transmitted according to a subcarrier spacing;

DETAILED DESCRIPTION

Figure 1:
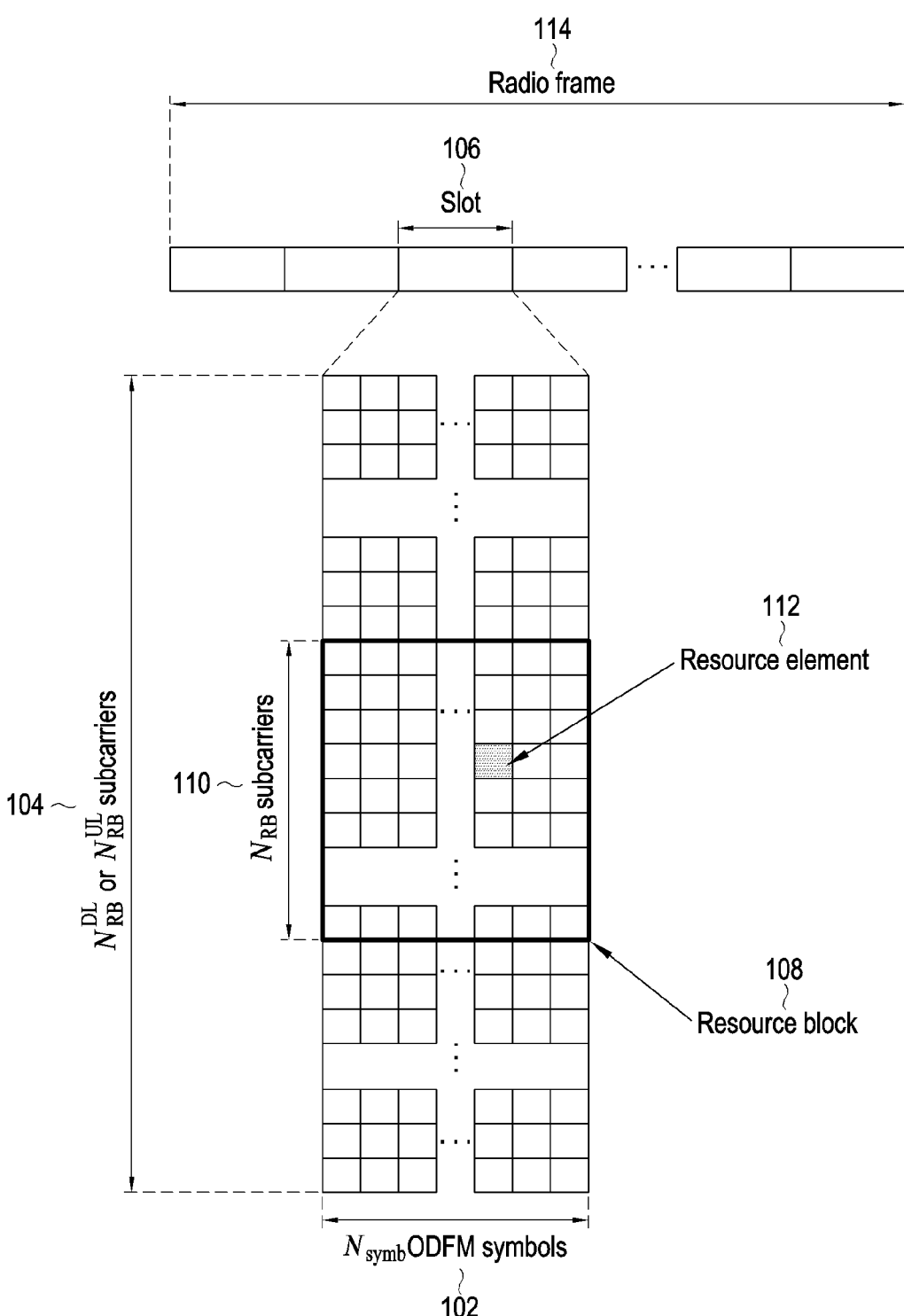
FIG. 1 is a diagram illustrating a downlink or uplink time-frequency domain transmission structure of a 5G (or new radio (NR)) system.

New radio (NR) access technology, a new 5G communication technology, is designed to be able to freely multiplex various services in time and frequency resources and, accordingly, waveforms/numerology and reference signals may be allocated dynamically or freely as necessary in services. To provide an optimal service to a terminal in wireless communication, it is critical to provide data transmission optimized via measurement of interference and the quality of channel, and thus, accurate measurement of the channel state is essential. However, unlike 4G communication in which no significant change occurs in channel and interference characteristics depending on frequency resources, 5G channels experience drastic changes in channel and interference characteristics depending on services and thus need support of a subset in light of Frequency Resource Group (FRG) that allows them to be divided and measured. Meanwhile, types of services supported in the NR system may be divided into categories, such as Enhanced mobile broadband (eMBB), mMTC (massive Machine Type Communications) (mMTC), and Ultra-Reliable and low-latency Communications (URLLC). eMBB, mMTC, and URLLC are services targeting high-rate transmission of high-volume data, minimized terminal power consumption and access by a plurality of terminals, and high reliability and low latency, respectively. Different requirements may be applied depending on types of services applied to the terminal.

As such, a plurality of services may be provided to a user in a communication system, and there are required a method for providing each service within the same time interval according to a characteristic and an apparatus using this for providing the plurality of services to the user.

Hereinafter, an embodiment of the disclosure are described in detail with reference to the accompanying drawings.

In describing an embodiment, the description of a technology which is known in the art and is not directly related to the disclosure is omitted. This is for further clarifying the gist of the disclosure without making it unclear.

For the same reasons, some components may be exaggerated or schematically shown. A size of each component does not necessarily reflects a real size of each component. The same reference numeral is used to refer to the same component throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same component throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments of the disclosure, a " . . . unit" may include one or more processors.

A wireless communication system evolves beyond voice-centered services to a broadband wireless communication system to provide a high data rate and high-quality packet data service, such as 3GPP high speed packet access (HSPA), long term evolution (LTE) or evolved universal terrestrial radio access (E-UTRA), LTE-advanced (LTE-A), 3GPP2 high rate packet data (HRPD), ultra-mobile broadband (UMB), and institute of electrical and electronics engineers (IEEE) 802.16e communication standards. Further, for a 5G wireless communication system, 5G or new radio (NR) communication is being standardized.

As a representative broadband wireless communication system, the NR system adopts orthogonal frequency division multiplexing (OFDM) for downlink (DL) and uplink (UL). More specifically, the NR system employs cyclic-prefix OFDM (CP-OFDM) for downlink and two schemes, i.e., CP-OFDM and discrete Fourier transform spreading OFDM (DFT-S-OFDM) for uplink. Uplink means a wireless link where a terminal (a user equipment (UE)) or a mobile station (MS)) transmits data or control signals to the base station (BS, or eNode B), and downlink means a wireless link where the base station transmits data or control signals to the terminal. Such multiple access scheme allocates and operates time-frequency resources carrying data or control information per user not to overlap, i.e., to maintain orthogonality, to thereby differentiate each user's data or control information.

A NR system adopts hybrid automatic repeat request (HARQ) scheme that re-transmits corresponding data through a physical layer if decoding fails at initial transmission. By the HARQ scheme, if a receiver fails to precisely decode data, the receiver transmits information (negative acknowledgement (NACK)) indicating the decoding failure to a transmitter so that the transmitter may re-transmit the corresponding data through the physical layer. The receiver raises a data reception capability by combining the data re-transmitted by the transmitter with the data for which decoding has failed before. Further, if the receiver precisely decode data, the receiver may transmit information (acknowledgment (ACK)) indicating decoding succeeds to the transmitter so that the transmitter may transmit new data.

FIG. 1 is a diagram illustrating a basic structure of a time-frequency domain which is radio resource domain where the data or control channel is transmitted on a downlink or uplink in an NR system.

Figure 2:
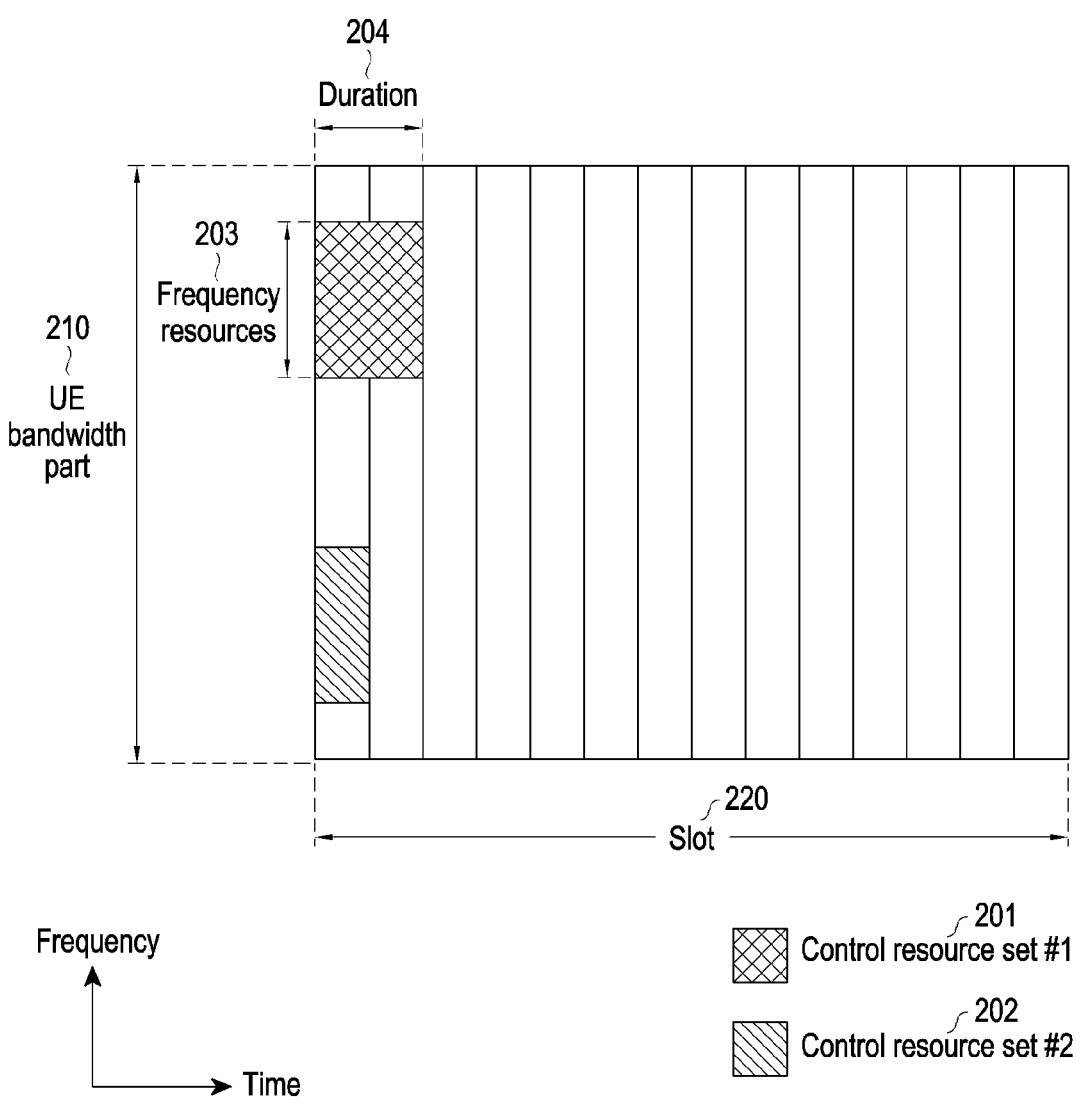
FIG. 2 is a diagram illustrating a control region in which a downlink control channel is transmitted in a 5G wireless communication system.

In FIG. 1, a horizontal axis refers to a time domain, and a vertical axis refers to a frequency domain. A minimum transmission unit in the time domain is an OFDM symbol, and Nsymb (102) OFDM symbols together form one slot 106. A length of a subframe is defined as 1.0 ms, and a radio frame 114 is defined as 10 ms. A minimum transmission unit in the frequency domain is a subcarrier, and a bandwidth of an overall system transmission band consists of a total of NBW (104) subcarriers. One frame may be defined as 10 ms. One subframe may be defined as 1 ms, and thus, the one frame may consist of a total of 10 subframes. One slot may be defined as 14 OFDM symbols (that is, the number $(N_{symb}^{slot})$ of symbols per slot=14). The one subframe may be composed of one or more slots, and the number of the slots included in the one subframe may vary according to a set value for subcarrier spacing. An example in FIG. 2 illustrates a case that a subcarrier spacing set value is $\mu$=0 and a case that a subcarrier spacing set value is $\mu$=1. If $\mu$=0, one subframe may consist of one slot, and if $\mu$=1, one subframe may consist of two slots. In other words, according to the set value $\mu$ for the subcarrier spacing, the number $(N_{slot}^{subframe,\mu})$ of slots per subframe may vary, and accordingly, the number $(N_{slot}^{frame,\mu})$ of slots per frame may differ. According to each subcarrier spacing $\mu$, $N_{slot}^{subframe,\mu}$ and $N_{slot}^{frame,\mu}$ may be defined in Table 1 below.

TABLE 1

| $\mu$ | $N_{symb}^{slot}$ | $N_{slot}^{frame,\ \mu}$ | $N_{slot}^{subframe,\ \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Before radio resource control (RRC) connected, a terminal may be configured with an initial bandwidth part (BWP) for initial access by a base station via a master information block (MIB). More specifically, the terminal may receive configuration information for a search space and a control region (control resource set (CORESET)) on which a physical downlink control channel (PDCCH) may be transmitted to receive system information (remaining system information (RMSI) or system information block 1 which may correspond to SIB1) necessary for the initial access through the MIB in an initial access phase. Each of the control region and the search space configured with the MIB may be regarded as identity (ID) 0. The base station may notify the terminal of configuration information, such as frequency allocation information, time allocation information, numerology, and/or the like for a control region #0, via the MIB. Further, the base station may notify the terminal of configuration information for occasion and monitoring period for the control region #0, i.e., configuration information for a search space #0, via the MIB. The terminal may regard a frequency range set as the control region #0 obtained from the MIB, as the initial BWP for the initial access. At this time, an identity (ID) of the initial BWP may be regarded as 0.

The MIB may include the following information.

```
<MIB>
  ASN1START
  TAG-MIB-START
  MIB::=SEQUENCE{
    systemFrameNumber BIT STRING (SIZE (6)),
    subCarrierSpacingCommon          ENUMERATED
      {scs15or60, scs30or120}
    ssb-SubcarrierOffset INTEGER (0 . . . 15),
    dmrs-TypeA-Position ENUMERATED {pos2, pos3},
    pdcch-ConfigSIB1 PDCCH-ConfigSIB1,
    cellBarred ENUMERATED {barred, noBarred},
    intraFreqReselection    ENUMERATED    {allowed,
      notAllowed},
    spare BIT STRING (SIZE (1))
  }
  TAG-MIB-STOP
  ASN1STOP
<MIB Field Description>
``` access phase. More specifically, a terminal may be configured with a control region for a downlink control channel on which downlink control information (DCI) to schedule an SIB may be transmitted from an MIB of a physical broadcast channel (PBCH). At this time, a bandwidth of the control region configured by the MIB may be regarded as the initial band width part, and the terminal may receive a physical downlink shared channel (PDSCH) on which the SIB is transmitted, via the configured initial band width part. The initial band width part may be utilized for other system information (OSI), paging, and random access as well as for receiving the SIB.

If the terminal is configured with one or more band width parts, a base station may indicate, to the terminal, a change in BWP using a band width part indicator within the DCI.

A basic resource unit in a time-frequency domain is a resource element (RE) 112, and may be represented with an OFDM symbol index and a subcarrier index. A resource block (RB) 108 (or a physical resource block (PRB)) is defined as NRB (110) contiguous subcarriers in a frequency domain. Generally, a minimum transmission unit of data is the RB unit. Generally in an NR system, Nsymb=14, NRB=12, and, NBW is proportional to a bandwidth of system transmission band. A data rate may increase in proportion to the number of RBs scheduled for the terminal.

| MIB field descriptions |
| --- |
| cellBarred |
| Value barred means that the cell is barred, as defined in TS 38.304 [20]. |
| dmrs-TypeA-Position |
| Position of (first) DM-RS for downlink (see TS 38.211 [16], clause 7.4.1.1.2) and uplink (see TS 38.211 [16], clause 6.4.1.1.3). |
| intraFreqReselection |
| Controls cell selection/reselection to intra-frequency cells when the highest ranked cell is barred, or treated as barred by the UE, as specified in TS 38.304 [20]. |
| pdcch-ConfigSIB1 |
| Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213 [13]. clause 13). |
| ssb-SubcarrierOffset |
| Corresponds to kSSB (see TS 38.213 [13]), which is the frequency domain offset between SSB and the overall resource block grid in number of subcarriers. (See TS 38.211 [16], clause 7.4.3.1). The value range of this field may be extended by an additional most significant bit encoded within PBCH as specified in TS 38.213 [13] This field may indicate that this cell does not provide SIB1 and that there is hence no CORESET#0 configured in MIB (see TS 38.213 [13], clause 13). In this case, the field pdcch-ConfigSIB1 may indicate the frequency positions where the UE may (not) find a SS/PBCH with a control resource set and search space for SIB1 (see TS 38.213 [13], clause 13) |
| subCarrierSpacingCommon |
| Subcarrier spacing for SIB1, Msg.2/4 for initial access, paging and broadcast SI-messages. If the UE acquires this MIB on an FRI carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz. |
| systemFrameNumber |
| The 6 most significant bits (MSB) of the 10-bit System Frame Number (SFN). The 4 LSB of the SFN are conveyed in the PBCH transport block as part of channel coding (i.e. outside the MIB encoding), as defined in clause 7.1 in TS 38.212 [17]. |

In a method for configuring a bandwidth part, terminals before RRC connected may receive configuration information for an initial band width part via an MIB in an initial In the NR system, in a case of FDD system in which a downlink and a uplink are distinguished with a frequency, a downlink transmission bandwidth and a uplink transmission bandwidth may differ from each other. A channel bandwidth refers to an RF bandwidth corresponding to a system transmission bandwidth. Table 2 and Table 3 show some of corresponding relationships among a system transmission bandwidth, subcarrier spacing, and a channel bandwidth defined in the NR system, for a frequency band lower than 6 GHz and a frequency band higher than 6 GHz, respectively. For example, in an NR system with a channel bandwidth of 100 MHz and subcarrier spacing of 30 kHz, a transmission bandwidth is composed of 273 RBs. In the following, N/A may be a bandwidth-subcarrier combination not supported by the NR system.

TABLE 2

| Configuration of frequency range 1 (FR1) | | | | | |
|---|---|---|---|---|---|
| SCS (KHz) | 5 MHz NRB | 10 MHz NRB | 15 MHz NRB | 20 MHz NRB | 25 MHz NRB | 30 MHz NRB |
| 15 | 25 | 52 | 79 | 106 | 133 | 160 |
| 30 | 11 | 24 | 38 | 51 | 65 | 78 |
| 60 | N/A | 11 | 18 | 24 | 31 | 38 |

| Configuration of frequency range 1 (FR1) | | | | | |
|---|---|---|---|---|---|
| SCS (KHz) | 40 MHz NRB | 50 MHz NRB | 60 MHz NRB | 80 MHz NRB | 90 MHz NRB | 100 MHz NRB |
| 15 | 216 | 270 | N/A | N/A | N/A | N/A |
| 30 | 106 | 133 | 162 | 217 | 245 | 273 |
| 60 | 51 | 65 | 79 | 107 | 121 | 135 |

TABLE 3

| Configuration of frequency range 2 (FR2) | | | | | |
|---|---|---|---|---|---|
| Channel bandwidth BWChannel [MHz] | subcarrier spacing | 50 MHz | 100 MHz | 200 MHz | 400 MHz |
| Transmission bandwidth configuration NRB | 60 kHz | 66 | 132 | 264 | N/A |
| | 120 kHz | 32 | 66 | 132 | 264 |

In the NR system, a frequency range may be defined separately for FR1 and FR2 as in Table 4 below.

TABLE 4

| Frequency range designation | Corresponding frequency range |
|---|---|
| FR1 | 450 MHz–7125 MHz |
| FR2 | 24250 MHz–52600 MHz |

In the above, ranges of FR1 and FR2 may be changed differently and applied. For example, a frequency range of FR1 may be changed from 450 MHz up to 6000 MHz.

Next, a synchronization signal (SS)/PBCH block in 5G will be described.

The SS/PBCH block may mean a physical layer channel block composed of a primary SS (PSS), a secondary SS (SSS), and a PBCH. Details are as follows.

PSS: A signal that serves as a reference for downlink time/frequency synchronization and provides a part of information for a cell ID.

SSS: serves as a reference for downlink time/frequency synchronization, and provides the rest of the information for the cell ID, which the PSS does not provide. Additionally, it may serve as a reference signal for demodulation of a PBCH.

PBCH: provides essential system information necessary for a terminal to transmit and receive a data channel and a control channel. The essential system information may include search space-related control information indicating radio resource mapping information for the control channel, scheduling control information for a separate data channel for transmitting system information, and/or the like.

SS/PBCH block: The SS/PBCH block is composed of a combination of the PSS, the SSS, and the PBCH. One or more SS/PBCH blocks may be transmitted within 5 ms, and each transmitted SS/PBCH block may be distinguished with an index.

The terminal may detect the PSS and the SSS in the initial access phase and may decode the PBCH. The terminal may obtain the MIB from the PBCH and may be therefrom configured with a control region #0 (which may correspond to a control region whose control region index is 0). The terminal may perform monitoring on the control region #0, assuming that a selected SS/PBCH block and a demodulation reference signal (DMRS) transmitted in the control region #0 are quasi-co-located (QCLed). The terminal may receive system information from downlink control information transmitted in the control region #0. The terminal may obtain configuration information related to a random access channel (RACH) required for an initial access from the received system information. The terminal may transmit a physical RACH (PRACH) to the base station considering the selected SS/PBCH index, and the base station receiving the PRACH may obtain information for the SS/PBCH block index selected by the terminal. Through this process, the base station may know which block the terminal has selected from each SS/PBCH block and monitors the control region #0 related thereto.

Next, downlink control information (DCI) in a 5G system will be described in detail.

In the 5G system, scheduling information for uplink data (or a physical uplink shared channel (PUSCH)) or downlink data (or a physical downlink data channel (PDSCH)) is transmitted from a base station via DCI to a terminal. The terminal may monitor a DCI format for fallback and a DCI format for non-fallback for the PUSCH or the PDSCH. The fallback DCI format may be configured with a fixed field predefined between the base station and the terminal, and the non-fallback DCI format may include a configurable field. The DCI may include other various formats other than this and, it may indicate whether the DCI is one for power control or one for notifying a slot format indicator (SFI) depending on each format.

The DCI may be transmitted via the PDCCH, which is a physical downlink control channel, through a channel coding and modulation process. A cyclic redundancy check (CRC) is added to a DCI message payload, and the CRC is scrambled with a radio network temporary identifier (RNTI) which corresponds to an identity of the terminal. Different RNTIs may be used for the purposes of the DCI message, e.g., terminal-specific (or UE-specific) data transmission, power control command, or random access response. That is, the RNTI is not explicitly transmitted, but the RNTI is included in a CRC calculation process and transmitted. Upon receiving the DCI message transmitted on the PDCCH, the terminal may identify the CRC using an allocated RNTI, and if the identified result of the CRC is correct, the terminal may know that the message has been transmitted to the terminal. The PDCCH is mapped and transmitted in a control resource set (CORESET) configured for the terminal.

For example, DCI scheduling a PDSCH for system information (SI) may be scrambled with an SI-RNTI. DCI scheduling a PDSCH for a random access response (RAR) message may be scrambled with an RA-RNTI. DCI scheduling a PDSCH for a paging message may be scrambled with a P-RNTI. DCI notifying a slot format indicator (SFI) may be scrambled with an SFI-RNTI. DCI notifying transmit power control (TPC) may be scrambled with a TPC-RNTI. DCI to schedule a terminal-specific PDSCH or PUSCH may be scrambled with a cell RNTI (C-RNTI). In the above, scramble of DCI with an RNTI value may mean that the RNTI value is added to a CRC bit added to the DCI by an XOR operation (0+0=0, 1+0=1, and 1+1=0). Here, the XOR operation may be a modulo-2 operation. If the number of bits of the CRC of the DCI is different from the number of bits of the RNTI, an operation may be performed with an LSB or MSB of the one with more bits. For example, if the CRC of the DCI has 24 bits and the RNTI has 16 bits, the RNTI may be scrambled with the LSB 16 bit of the CRC.

A DCI format 0_0 may be used as fallback DCI to schedule a PUSCH, and at this time, CRC may be scrambled with a C-RNTI. The DCI format 0_0 whose CRC is scrambled with the C-RNTI may include, e.g., the following information,

TABLE 5

Identifier for DCI formats—[1] bit
Frequency domain resource assignment—$[\lceil \log_2(N_{RB}^{UL,\ BWP}(N_{RB}^{UL,\ BWP} + 1)/2)\rceil]$ bits
Time domain resource assignment—X bits
Frequency hopping flag—1 bit.
Modulation and coding scheme—5 bits
New data indicator—1 bit
Redundancy version—2 bits
HARQ process number—4 bits
TPC command for scheduled PUSCH (Transmit power control command for scheduled PUSCH)—[2] bits
Uplink (UL)/ supplementary UL (SUL) indicator—0 or 1 bit A DCI format 0_1 may be used as non-fallback DCI to schedule a PUSCH, and at this time, CRC may be scrambled with a C-RNTI. The DCI format 0_1 whose CRC is scrambled with the C-RNTI may include, e.g., the following information.

TABLE 6

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP} + 1)/2)\rceil$ bits
Time domain resource assignment - 1, 2, 3, or 4 bits
Virtual resource block (VRB)-to-physical resource block (PRB) mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook (if the dynamic HARQ-ACK codebook is used with the single HARQ-ACK codebook)
2nd downlink assignment index - 0 or 2 bits
2 bits for dynamic HARQ-ACK codebook with two HARQ-ACK sub-codebooks (if the dynamic HARQ-ACK codebook is used with the two HARQ-ACK sub-codebooks);
0 bit otherwise.
TPC command for scheduled PUSCH - 2 bits SRS resource indicator - $\left\lceil \log_2\left(\sum_{k=1}^{L_{max}} \binom{N_{SRS}}{k}\right)\right\rceil$ or $\lceil\log_2(N_{SRS})\rceil$ bits $\left\lceil \log_2\left(\sum_{k=1}^{L_{max}} \binom{N_{SRS}}{k}\right)\right\rceil$ bits for non-codebook based PUSCH transmission (if TABLE 6-continued PUSCH transmission is not based on a codebook);
  $\lceil log_2(N_{SRS}) \rceil$ codebook based PUSCH transmission (if PUSCH
transmission is based on a codebook).
  Precoding information and number of layers - up to 6 bits
  Antenna ports - up to 5 bits
  SRS request - 2 bits
  channel state information request (CSI request) - 0, 1, 2, 3, 4, 5, or 6 bits
  code block group (CBG) transmission information - 0, 2, 4, 6, or 8 bits
  Physical tracking reference signal (PTRS)-demodulation reference signal
(DMRS) association - 0 or 2 bits.
  beta_offset indicator - 0 or 2 bits
  demodulation reference signal sequence initialization (DMRS sequence
initialization) - 0 or 1 bit A DCI format 1_0 may be used as fallback DCI to schedule a PDSCH, and at this time, CRC may be scrambled with a C-RNTI. The DCI format 1_0 whose CRC is scrambled with the C-RNTI may include, e.g., the following information.

TABLE 7

Identifier for DCI formats – [1] bit
Frequency domain resource assignment $-\lceil^{log2\ (N_{RB}{}^{DL,BWP}(N_{RB}{}^{DL,BWP}+1)/2)\rceil}\rceil$ bits
Time domain resource assignment – X bits
VRB-to-PRB mapping – 1 bit.
Modulation and coding scheme – 5 bits
New data indicator – 1 bit
Redundancy version – 2 bits
HARQ process number – 4 bits
Downlink assignment index – 2 bits
TPC command for scheduled PUCCH – [2] bits
Physical uplink control channel (PUCCH) resource indicator – 3 bits
PDSCH-to-HARQ feedback timing indicator – [3] bits A DCI format 1_1 may be used as non-fallback DCI to schedule a PDSCH, and at this time, CRC may be scrambled with a C-RNTI. The DCI format 1_1 whose CRC is scrambled with the C-RNTI may include, e.g., the following information.

TABLE 8

Carrier indicator – 0 or 3 bits
Identifier for DCI formats – [1] bits
Bandwidth part indicator – 0, 1 or 2 bits
Frequency domain resource assignment
For resource allocation type 0, $\lceil N_{RB}{}^{DL,BWP}/P\rceil$ bits
For resource allocation type 1,
$\lceil log2\ (N_{RB}{}^{DL,BWP}(N_{RB}{}^{DL,BWP}+1)/2)\rceil$ bits
Time domain resource assignment –1, 2, 3, or 4 bits
VRB-to-PRB mapping – 0 or 1 bit, only for resource
allocation type 1.
0 bit if only resource allocation type 0 is configured;
1 bit otherwise.
PRB bundling size indicator – 0 or 1 bit
Rate matching indicator – 0, 1, or 2 bits
Zero power channel state information reference signal
(ZP CSI-RS) trigger – 0, 1, or 2 bits
For transport block 1 (for the first transport block):
Modulation and coding scheme – 5 bits
New data indicator – 1 bit
Redundancy version – 2 bits
For transport block 2 (for the second transport block):
Modulation and coding scheme – 5 bits
New data indicator – 1 bit
Redundancy version – 2 bits
HARQ process number – 4 bits TABLE 8-continued Downlink assignment index – 0 or 2 or 4 bits
TPC command for scheduled PUCCH – 2 bits
PUCCH resource indicator – 3 bits
PDSCH-to-HARQ feedback timing indicator – 3 bits
Antenna ports – 4, 5 or 6 bits
Transmission configuration indication – 0 or 3 bits
SRS request – 2 bits
Code block group (CBG) transmission information – 0, 2, 4, 6, or 8 bits
Code block group (CBG) flushing out information – 0 or 1 bit
DMRS sequence initialization – 1 bit Hereinafter, a method for allocating a time domain resource for a data channel in a 5G communication system will be described.

A base station may configure a terminal with a table for time domain resource allocation information for a downlink data channel (PDSCH) and an uplink data channel (PUSCH) via higher layer signaling (e.g., RRC signaling). For the PDSCH, a table including up to maxNrofDL-Allocations=16 entries may be configured and, for the PUSCH, a table including up to maxNrofUL-Allocations=16 entries may be configured. The time domain resource allocation information may include, e.g., PDCCH-to-PDSCH slot timing (which is designated K0 and corresponds to a time interval between a time point of reception of the PDCCH and a time point of transmission of the PDSCH scheduled by the received PDCCH) or PDCCH-to-PUSCH slot timing (which is designated K2 and corresponds to a time interval between a time point of the PDCCH and a time point of transmission of the PUSCH scheduled by the received PDCCH), information for a location and a length of a start symbol where the PDSCH or the PUSCH is scheduled within a slot, a mapping type of the PDSCH or the PUSCH, and/or the like. For example, information as illustrated in Tables 9 and 10 below may be notified from the base station to the terminal.

TABLE 9

```
PDSCH-TimeDomainResourceAllocationList information element
PDSCH-TimeDomainResourceAllocationList        ::=            SEQUENCE
(SIZE(1..maxNrofDL-Allocations)) OF PDSCH-TimeDomainResourceAllocation
PDSCH-TimeDomainResourceAllocation ::=  SEQUENCE {
      k0                                               INTEGER(0..32)
OPTIONAL,   -- Need S
      (PDCCH-to-PDSCH timing, slot unit)
mappingType                               ENUMERATED {typeA,
typeB},
      (PDSCH mapping type)
startSymbolAndLength                 INTEGER (0..127)
(Start symbol and length of PDSCH)
}
```

TABLE 10

```
PDSCH-TimeDomainResourceAllocationList information element
PDSCH-TimeDomainResourceAllocationList ::=   SEQUENCE
(SIZE(1..maxNrofDL-Allocations)) OF PDSCH-TimeDomainResourceAllocation
PDSCH-TimeDomainResourceAllocation ::=  SEQUENCE {
      k2                                               INTEGER(0..32)
OPTIONAL,   -- Need S
      (PDCCH-to-PDSCH timing, slot unit)
      mappingType                          ENUMERATED {typeA,
typeB},
      (PDSCH mapping type)
      startSymbolAndLength               INTEGER (0..127)
      (Start symbol and length of PDSCH)
}
```

The base station may notify the terminal of one of the entries in the table for the time domain resource allocation information via L1 signaling (e.g., DCI) (e.g., it may be indicated with a 'time domain resource allocation' field within the DCI). The terminal may obtain time domain resource allocation information for the PDSCH or the PUSCH based on the DCI received from the base station.

A downlink control channel in a 5G communication system will be described below in greater detail with reference to the drawings.

FIG. 2 is a diagram illustrating an example of a control region in which a downlink control channel is transmitted in a 5G wireless communication system. FIG. 2 illustrates an example in which two control regions (a control region #1 201 and a control region #2 202) are configured within one slot 220 on a time axis, and a bandwidth part of a terminal (a UE bandwidth part) 210 on a frequency axis. The control regions 201 and 202 may be configured in a particular frequency resource 203 within an overall system bandwidth part 210 on the frequency axis. One or more OFDM symbols may be configured on the time axis, which may be defined as a control region length (control resource set duration) 204. Referring to the example illustrated in FIG. 2, the control region #1 201 is configured with a control region length of two symbols, and the control region #2 202 is configured with a control region length of one symbol.

The control region in the above-described 5G may be configured via higher layer signaling (e.g., system information, an MIB, and RRC signaling) from the base station to the terminal. Configuring the terminal with a control region means providing the terminal with information such as a control region Identity, a frequency location of the control region, a symbol length of the control region, and/or the like. For example, the higher layer signaling may include information in Table 11 below.

TABLE 11

```
ControlResourceSet ::=                  SEQUENCE
      -- Corresponds to L1 parameter 'CORESET-ID'
      controlResourceSetId               ControlResourceSetId,
      (Control region identity)
      frequencyDomainResources           BIT STRING (SIZE (45)),
      (Frequency-axis resource allocation information)
      duration                           INTEGER (1..maxCoReSetDuration),
      (Time-axis resource allocation information)
      cce-REG-MappingType                       CHOICE {
      (CCE-to-REG mapping scheme)
          interleaved                           SEQUENCE {
              reg-BundleSize                        ENUMERATED {n2, n3, n6},
          (REG bundle size)
                  precoderGranularity
          ENUMERATED {sameAsREG-bundle, allContiguousRBs},
      interleaverSize                           ENUMERATED {n2, n3, n6}
              (Interleaver size)
              shiftIndex
```

TABLE 11-continued

```
    INTEGER(0..maxNrofPhysicalResourceBlocks-1)
        OPTIONAL
            (Interleaver shift)
        },
    nonInterleaved                    NULL
    },
    tci-StatesPDCCH                   SEQUENCE(SIZE (1..maxNrofTCI-
StatesPDCCH)) OF TCI-StateId           OPTIONAL,
    (QCL configuration information)
    tci-PresentInDCI                  ENUMERATED {enabled}
                                      OPTIONAL, -- Need S
}
```

In Table 11, tci-StatesPDCCH (simply referred to as transmission configuration indication (TCI) state) configuration information may include information for channel state information reference signal (CSI-RS) index or one or more SS/PBCH block indexes which are in QCL relationship with a DMRS transmitted in a corresponding control region.

For example, each control information included in a DCI format 1_1 which is scheduling control information (DL grant) for downlink data may be as follows.

Carrier indicator: indicates which carrier data scheduled by DCI is transmitted on—0 or 3 bits Identifier for DCI formats: indicates a DCI format, and specifically, is an indicator for identifying whether the corresponding DCI is for a downlink or a uplink.—[1] bits Bandwidth part indicator: indicates if there is a change in a bandwidth part.—0, 1 or 2 bits Frequency domain resource assignment: is resource allocation information indicating frequency domain resource allocation, and a resource expressed varies depending on whether a resource allocation type is 0 or 1.

Time domain resource assignment: is resource allocation information indicating time domain resource allocation, and may indicate one configuration of a predefined PDSCH time domain resource allocation list or higher layer signaling—1, 2, 3, or 4 bits VRB-to-PRB mapping: indicates a mapping relationship between a virtual resource block (VRB) and a physical resource block (PRB)—0 or 1 bit PRB bundling size indicator: indicates a size of physical resource block bundling assuming that the same precoding is applied—0 or 1 bit Rate matching indicator: indicates which rate match group is applied among rate match groups configured via a higher layer applied to a PDSCH—0, 1, or 2 bits ZP CSI-RS trigger: triggers a zero power channel state information reference signal—0, 1, or 2 bits Transport block (TB)-related configuration information: indicates a Modulation and coding scheme (MCS), a New data indicator (NDI), and a Redundancy version (RV) for one or two TBs.

Modulation and coding scheme (MCS): indicates a modulation scheme and a coding rate used for data transmission. That is, this may indicate a coding rate value which may indicate TBS and channel coding information along with information for whether it is QPSK, 16QAM, 64QAM, or 256QAM.

New data indicator: indicates whether HARQ initial transmission or re-transmission.

Redundancy version: indicates a redundancy version of HARQ.

HARQ process number: indicates a HARQ process number applied to a PDSCH—4 bits

Downlink assignment index: is an index for generating a dynamic HARQ-ACK codebook when reporting HARQ-ACK for a PDSCH—0 or 2 or 4 bits TPC command for scheduled PUCCH: Power control information applied to a PUCCH for HARQ-ACK report for a PDSCH—2 bits PUCCH resource indicator: Information indicating a resource of a PUCCH for HARQ-ACK report for a PDSCH—3 bits PDSCH-to-HARQ_feedback timing indicator: Configuration information for a slot in which a PUCCH for a HARQ-ACK report for a PDSCH is transmitted—3 bits Antenna ports: Information indicating an antenna port of a PDSCH DMRS and a DMRS CDM group in which a PDSCH is not transmitted—4, 5 or 6 bits Transmission configuration indication: Information indicating beam-related information for a PDSCH—0 or 3 bits SRS request: Information requesting SRS transmission—2 bits CBG transmission information: Information indicating which code block group (CBG) of data is transmitted through a PDSCH when code block group-based retransmission is configured—0, 2, 4, 6, or 8 bits CBG flushing out information: Information indicating whether a code block group previously received by a terminal may be used for HARQ combining—0 or 1 bit DMRS sequence initialization: indicates a DMRS sequence initialization parameter—1 bit In a case of data transmission via a PDSCH or PUSCH in the above, time domain resource assignment may be transferred by information for a slot on which a PDSCH/PUSCH is transmitted and the number L of symbols in which the PDSCH/PUSCH is mapped with a start symbol location S in the corresponding slot. Here, S may be a relative location from start of the slot, L may be the number of contiguous symbols, and S and L may be determined from a start and length indicator value (SLIV) defined as in Equation 1 below.

if $(L-1) \leq 7$ then $$SLIV = 14 \cdot (L-1) + S$$

else $$SLIV = 14 \cdot (14-L+1) + (14-1-S) \qquad \text{[Equation 1]}$$

where $0 < L \leq 14 - S$

In an NR system, a terminal may be configured with information for a slot on which a PDSCH/PUSCH is transmitted and a PDSCH/PUSCH mapping type and SLIV value in one row via RRC configuration (e.g., the information may be configured in a form of a table). Thereafter, in time domain resource allocation of the DCI, a base station may transfer, to a terminal, the SLIV value, the PDSCH/PUSCH mapping type, and the information for the slot on which the PDSCH/PUSCH is transmitted by indicating an index value in the configured table.

In the NR system, a type A and a type B have been defined as PDSCH mapping types. In the PDSCH mapping type A, the first symbol among DMRS symbols is located in the second or third OFDM symbol of a slot. In the PDSCH mapping type B, the first symbol among DMRS symbols of the first OFDM symbol in a time domain resource allocated by PUSCH transmission is located.

Downlink data may be transmitted on a PDSCH which is a physical channel for downlink data transmission. The PDSCH may be transmitted after the control channel transmission period, and scheduling information such as a specific mapping location in a frequency domain, a modulation scheme, and/or the like is determined based on DCI transmitted via a PDCCH.

Via an MCS among the control information constituting the DCI, the base station notifies the terminal of the modulation scheme which is applied to the PDSCH to be transmitted and a size of data to be transmitted (a transport block size (TBS)). In an embodiment, the MCS may be composed of 5 bits or more or fewer bits. The TBS corresponds to a size before applying channel coding for error correction to data (transport block (TB)) to be transmitted by the base station.

In the disclosure, a transport block (TB) may include a medium access control (MAC) header, a MAC control element, one or more MAC service data units (SDUs), and padding bits. Alternatively, the TB may denote a unit of data delivered from a MAC layer to a physical layer or a MAC protocol data unit (PDU).

A modulation scheme supported in the NR system are quadrature phase shift keying (QPSK), 16 quadrature amplitude modulation (16QAM), 64QAM, and 256 QAM, and their respective modulation orders (Qm) are 2, 4, 6, and 8. That is, 2 bits may be transmitted per symbol in a case of QPSK modulation, 4 bits may be transmitted per symbol in a case of 16QAM modulation, 6 bits may be transmitted per symbol in a case of 64QAM modulation, and 8 bits may be transmitted per symbol in a case of 256QAM modulation.

Figure 3:
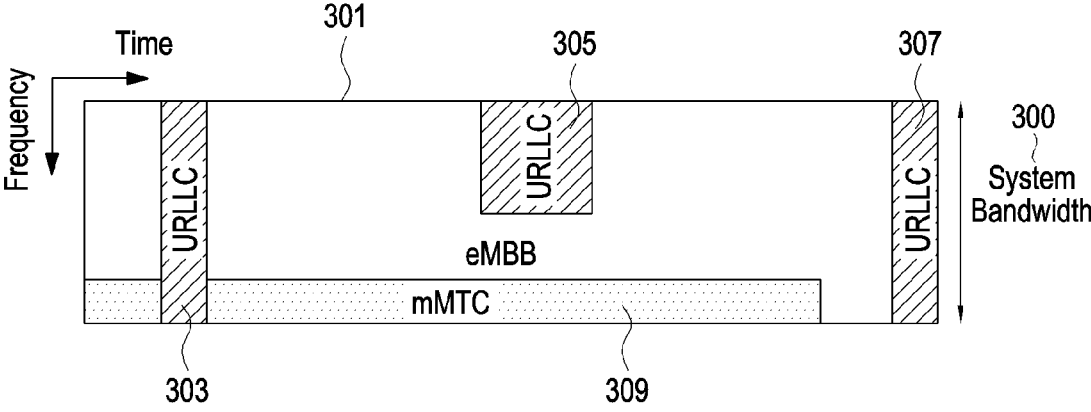
FIG. 3 is a diagram illustrating an example in which eMBB, URLLC, and mMTC data are allocated in a frequency-time resource in a communication system.
Figure 4:
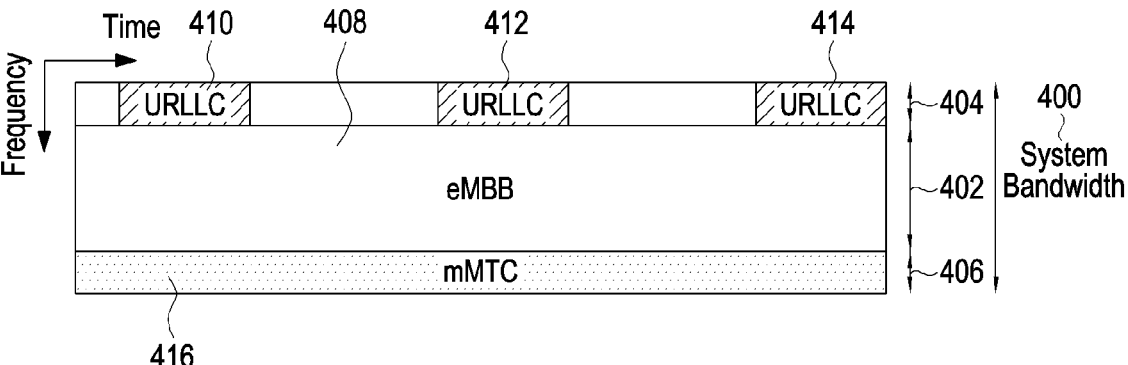
FIG. 4 is a diagram illustrating another example in which eMBB, URLLC, and mMTC data are allocated in a frequency-time resource in a communication system.

FIGS. 3 and 4 are diagrams illustrating an example in which data of eMBB, URLLC, and mMTC which are services considered in a 5G or NR system, are allocated in a frequency-time resource.

Referring to FIGS. 3 and 4, it may be identified how a frequency and time resource is allocated for information transmission in each system.

FIG. 3 is a diagram illustrating an example in which eMBB, URLLC, and mMTC data is allocated in an entire system frequency band. FIG. 3 illustrates an example in which data for eMBB, URLLC, and mMTC is allocated in an entire system frequency band 300. If URLLC data 303, 305, and 307 needs to be generated and transmitted while eMBB 301 and mMTC 309 are allocated in a specific frequency band and transmitted, URLLC data 303, 305, and 307 may be transmitted by emptying or not transmitting a part in which the eMBB 301 and the mMTC 309 have already been allocated. Among the above services, the URLLC requires a decrease in latency time, so URLLC data may be allocated (303, 305, and 307) in a portion of a resource 301 in which the eMBB is allocated. If the URLLC is additionally allocated and transmitted in the resource to which the eMBB is allocated, eMBB data may not be transmitted in an overlapped frequency-time resource, so transmission performance of the eMBB data may be lowered. That is, a failure to transmit the eMBB data may occur due to the allocation of the URLLC.

FIG. 4 is a diagram illustrating an example in which eMBB, URLLC, and mMTC data is allocated, with a system frequency band divided. In FIG. 4, an entire system frequency band 400 may be divided into subbands 402, 404, and 406, and each of the subbands 402, 404, and 406 may be used for transmitting data and a service. Information related to configuration of the subbands may be predetermined, and this information may be transmitted from a base station to a terminal via higher level signaling. Alternatively, the subband may be divided by the base station or a network node in an arbitrary manner, so services may be provided without transmitting separate subband configuration information to the terminal. FIG. 4 illustrates an example in which subbands 402, 404, and 406 are used for transmission of eMBB data, URLLC data, and mMTC data, respectively.

To describe a method and apparatus proposed in an embodiment, the terms "physical channel" and "signal" in an NR system may be used. However, the content of the disclosure may be applied to other wireless communication systems than the NR system.

Hereinafter, embodiments of the disclosure are described in detail with reference to the accompanying drawings. When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

According to the disclosure, a downlink (DL) refers to a wireless transmission path of a signal transmitted from a base station to a terminal, and a uplink (UL) refers to a wireless transmission path of a signal transmitted from the terminal to the base station.

Although the NR system is described in connection with embodiments of the disclosure, as an example, embodiments of the disclosure may also apply to other communication systems with a similar technical background or channel form. Further, embodiments of the disclosure may be modified in such a range as not to significantly depart from the scope of the disclosure under the determination by one of ordinary skill in the art and such modifications may be applicable to other communication systems.

In the disclosure, the terms "physical channel" and "signal" may be used interchangeably with "data" or "control signal." For example, a PDSCH is a physical channel on which data is transmitted, but in the disclosure, a PDSCH may be data.

As used herein, the term "higher layer signaling" may refer to a method for delivering a signal from the base station to the terminal using a downlink data channel of a physical layer or from the terminal to the base station using an uplink data channel of the physical layer and may be interchangeably used with "RRC signaling" or "MAC control element (CE)."

Figure 5:
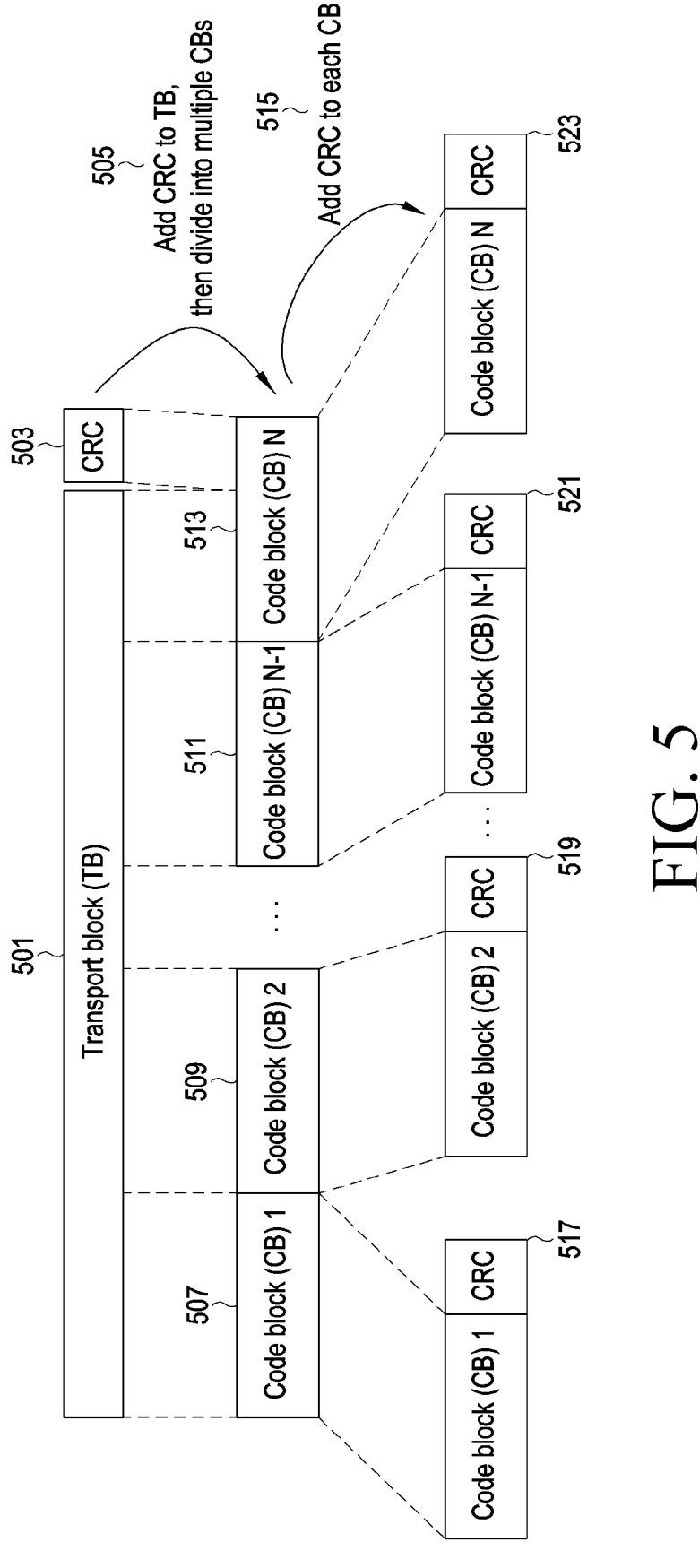
FIG. 5 is a diagram illustrating an example in which one transport block is divided into several code blocks and a CRC is added.

FIG. 5 is a diagram illustrating an example process in which one transport block is divided into several code blocks and a CRC is added.

Referring to FIG. 5, a CRC 503 may be added to at the end or beginning of one transport block (TB) 501 which is to be transmitted on a uplink or a downlink. The CRC 503 may have 16 bits, 25 bits, or a fixed number of bits, or a variable number of bits according to a channel condition, and/or the like, and be used to determine whether channel coding succeeds. A block in which the CRC 503 is added to the TB 501 may be divided into several code blocks (CBs) 507, 509, 511, and 513 (505). Here, a maximum size of a code block may be previously determined and may be divided, and, in this case, the last code block 513 may be smaller than the other code blocks 507, 509, and 511. However, this is only an example, and according to another example, 0, a random value, or 1 may be inserted into the last code block 513, so the last code block 513 and the other code blocks 507, 509 and 511 have the same length.

CRCs 517, 519, 521, and 523 may be added to the code blocks 507, 509, 511, and 513, respectively (515). A CRC may have 16 bits, 25 bits, or a fixed number of bits, and be used to determine whether channel coding succeeds.

The TB 501 and a cyclic generator polynomial may be used to generate the CRC 503, and the cyclic generator polynomial may be defined in various ways. For example, assuming that a cyclic generator polynomial for a 24-bit CRC meets: gCRC24A(D)=D24+D23+D18+D17+D14+D11+D10+D7+D6+D5+D4+D3+D+1, and L=24, for TB data $a_0, a_1, a_2, a_3, \ldots, a_{A-1}$, CRC $p_0, p_1, p_2, p_3, \ldots, p_{L-1}$ may be determined as the value whose remainder is 0 when $a_0D^{A+23}+a_1D^{A+22}+ \ldots +a_{A-1}D^{24}+p_0D^{23}+p_1D^{22}+ \ldots +p_{22}D^1+p_{23}$ is divided by gCRC24A(D). In the above-described example, it is assumed that the CRC length L is 24 as an example, but the CRC length L may be determined to have a different value, e.g., 12, 16, 24, 32, 40, 48, 64, etc.

After the CRC is added to the TB through this process, the TB+CRC may be divided into N CBs 507, 509, 511, and 513. CRCs 517, 519, 521, and 523 may be added to the CBs 507, 509, 511, and 513, respectively (515). A CRC added to a CB may have a different length than a CRC added to a TB, or a different cyclic generator polynomial may be used to generate the CRC. The CRC 503 added to the TB and the CRCs 517, 519, 521, and 523 added to the codeblocks may be omitted depending on a type of a channel code to be applied to the codeblocks. For example, if an LDPC code, not a turbo code, is applied to the codeblocks, the CRCs 517, 519, 521, and 523 to be inserted into the codeblocks may be omitted.

However, even when the LDPC is applied, the CRCs 517, 519, 521, and 523 may be added to the codeblocks. Further, when a polar code is used, a CRC may also be added or omitted.

As described above in FIG. 5, a maximum length of one codeblock is determined depending on a type of channel coding applied to a TB to be transmitted, and depending on the maximum length of the codeblock, the TB and the CRC added to the TB may be divided into codeblocks.

In an existing LTE system, a CRC for CB is added to a divided CB, and data bits of the CB and the CRC are encoded with a channel code, so coded bits are determined, and the number of bits to be rate-matched is determined as previously agreed on respective coded bits.

In an NR system, a TB size (TBS) may be calculated by the following steps.

Step 1:

$$N'_{RE}$$

which is the number of REs allocated for PDSCH mapping in one PRB in an allocated resource is calculated.

$$N'_{RE}$$

may be calculated as $$N^{RB}_{sc} \cdot N^{sh}_{symb} - N^{PRB}_{DMRS} - N^{PRB}_{oh}.$$

Here, $$N^{RB}_{sc}$$

is 12, and $$N^{sh}_{symb}$$

may indicate the number of OFDM symbols allocated to a PDSCH.

$$N^{PRB}_{DMRS}$$

is the number of REs in one PRB occupied by a DMRS of the same CDM group.

$$N^{PRB}_{oh}$$

is the number of REs occupied by overhead in one PRB configured by higher signaling, and may be set to one of 0, 6, 12, and 18. Thereafter, the total number $N_{RE}$ of REs allocated to the PDSCH may be calculated. $N_{RE}$ is calculated as $$\min(156, N'_{RE}) \cdot n_{PRB},$$

and $n_{PRB}$ denotes the number of PRBs allocated to a terminal.

Step 2: $N_{info}$, which is the number of bits of temporary information, may be calculated as $N_{RE}*R*Q_m*v$. Here, R is a code rate, Qm is a modulation order, and information for this value may be delivered using a MCS bit field of DCI and a pre-determined table. v is the number of allocated layers. If $N_{info} \leq 3824$, the TBS may be calculated through step 3 below. Otherwise, the TBS may be calculated through step 4.

Step 3: By equations $$N'_{info} = \max\left(24, 2^n * \left\lfloor \frac{N_{info}}{2^n} \right\rfloor\right)$$

and n=max(3,$\lfloor \log_2(N_{info}) \rfloor$−6), $$N'_{info}$$

may be calculated. The TBS may be determined to be a value closest to $$N'_{info}$$

among values not smaller than $$N'_{info}$$

in Table 12 below.

TABLE 12

| Index | TBS |
|-------|-----|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |

TABLE 12-continued

| Index | TBS |
|-------|-----|
| 63 | 1362 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 3280 |
| 78 | 2408 |
| 79 | 2472 |
| 80 | 2536 |
| 81 | 2600 |
| 82 | 2664 |
| 83 | 2728 |
| 84 | 2792 |
| 88 | 2856 |
| 86 | 2976 |
| 87 | 3104 |
| 88 | 3240 |
| 89 | 3368 |
| 90 | 3496 |
| 91 | 3624 |
| 92 | 3762 |
| 93 | 3824 |

Step 4. By equations $$N'_{info} = \max\left(3840, 2^n \times \text{round}\left(\frac{N_{info} - 24}{2^n}\right)\right)$$

and $n = \lfloor \log_2(N_{info} - 24) \rfloor - 5$, $$N'_{info}$$

may be calculated. The TBS may be determined by an $$N'_{info}$$

value and [pseudo-code 1] below. In the following, C corresponds to the number of code blocks included in one TB.

[Start of Pseudo-Code 1]

if R≤¼

$$TBS = 8 * C * \left\lceil \frac{N'_{info} + 24}{8 * C} \right\rceil - 24, \text{ where } C = \left\lceil \frac{N'_{info} + 24}{3816} \right\rceil$$

else if $$N'_{info} > 8424$$

$$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * \left\lceil \frac{N'_{info} + 24}{8} \right\rceil - 24$$

end if end if

[End of Pseudo-Code 1]

When one CB is inputted to an LDPC encoder in an NR system, it may be outputted, with parity bits added. At this time, amount of parity bits may vary depending on an LDCP base graph. A method for transmitting all parity bits generated by LDPC coding for a specific input may be referred to as full buffer rate matching (FBRM), and a method for limiting the number of transmittable parity bits may be referred to as limited buffer rate matching (LBRM). If a resource is allocated for data transmission, an output of the LDPC encoder is created as a circular buffer, and bits of the created buffer are repeatedly transmitted as much as the allocated resource, and at this time, a length of the circular buffer may be designated $N_{cb}$.

If the number of all parity bits generated by the LDPC coding is N, in the FBRM method, $N_{cb}=N$. In the LBRM method, Nob is min (N, $N_{ref}$), $N_{ref}$ is given as $$\left\lfloor \frac{TBS_{LBRM}}{C \cdot R_{LBRM}} \right\rfloor,$$

and $R_{LBRM}$ may be determined as $\frac{2}{3}$. To obtain $TBS_{LBRM}$, the above-described method for obtaining a TBS is used, assuming a maximum number of layers and a maximum modulation order supported by a terminal in a corresponding cell. The maximum modulation order Qm is assumed to be 8, if an MCS table supporting 256QAM is used for at least one BWP in the corresponding cell, or otherwise, 6 (64QAM), and a code rate is assumed to be a maximum code rate 948/1024, $N_{RE}$ is assumed to be $156 \cdot n_{PRB}$, and $n_{PRB}$ is assumed to be $n_{PRB, LBRM}$. $n_{PRB, LBRM}$ may be given in Table 13 below.

TABLE 13

| Maximum number of PRBs across all configured BWPs of a carrier | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

A maximum data rate supported by the terminal in the NR system may be determined through Equation 2 below.

[Equation 2]

data rate (in Mbps) =

$$10^{-6} \cdot \sum_{j=1}^{j} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right)$$

28

In Equation 2, J is the number of carriers bundled by carrier aggregation, $R_{max}=948/1024$, $$v_{Layers}^{(j)}$$

is the maximum number of layers, $$Q_m^{(j)}$$

is the maximum modulation order, $f^{(j)}$ is a scaling index, and $\mu$ means subcarrier spacing. As $f^{(j)}$, one of 1, 0.8, 0.75, and 0.4 may be reported by the terminal and $\mu$ may be given in Table 14 below.

TABLE 14

| $\mu$ | $\Delta f = 2^{\mu} \cdot 15[KHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

$$T_s^{\mu}$$

is an average OFDM symbol length, $$T_s^{\mu}$$

may be calculated as $$\frac{10^{-3}}{14 \cdot 2^{\mu}},$$

and $$N_{PRB}^{BW(j),\mu}$$

is a maximum number of RBs in BW(j). $OH^{(j)}$, as an overhead value, may be given as 0.14 for a downlink and 0.18 for a uplink in FR1 (a band lower than or equal to 6 GHz), and as 0.08 for a downlink and 0.10 for a uplink in FR2 (band above 6 GHz). Through Equation 2, a maximum data rate in a downlink in a cell having a 100 MHz frequency bandwidth at a 30 kHz subcarrier spacing may be calculated as Table 15 below.

TABLE 15

| $f^{(j)}$ | $v_{Layers}^{(j)}$ | $Q_m^{(j)}$ | Rmax | $N_{PRB}^{BW(j),\mu}$ | $T_s^{\mu}$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.67143E−05 | 0.14 | 1752.8 |
| 0.4 | 4 | 8 | 0.92578125 | 273 | 3.57143E−05 | 0.14 | 934.8 |

In contrast, an actual data rate that the terminal may measure in actual data transmission may be a value obtained by dividing amount of data by data transmission time. This may be a value obtained by dividing a TBS by a TTI length for 1 TB transmission or dividing sum of TBSs by the TTI length for 2 TB transmission. For example, as assumed to obtain Table 15, a maximum actual data rate in the downlink in the cell having the 100 MHz frequency band at the 30 kHz subcarrier spacing may be determined as shown in Table 16 according to the number of PDSCH symbols allocated.

TABLE 16

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.6 | 12 | 225,280 | 27 | 225,480 | 0.107143 | 2,104.48 |
| 4 | 8 | 40 | 10920 | 323506.0 | 13 | 319,488 | 38 | 319,784 | 0.142857 | 2,238.49 |
| 5 | 8 | 52 | 14196 | 420566.6 | 13 | 417,792 | 50 | 417,976 | 0.178571 | 2,340.67 |
| 6 | 8 | 64 | 17472 | 517608.0 | 13 | 516,096 | 62 | 616,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2.467.16 |
| 9 | 8 | 100 | 27300 | 808762.5 | 14 | 802,816 | 98 | 803,304 | 0.321429 | 2,499,17 |
| 10 | 8 | 112 | 30576 | 905814.0 | 14 | 901,120 | 107 | 901,344 | 0.357143 | 2,523,76 |
| 11 | 8 | 124 | 33852 | 1002865.5 | 14 | 999,424 | 119 | 999,576 | 0.392857 | 2.544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,962 | 152 | 1,277,992 | 0.500000 | 2,855.98 |

The maximum data rate supported by the terminal may be identified via Table 7, and the actual data rate following the allocated TBS may be identified via Table 8. At this time, there may be a case that the actual data rate is larger than the maximum data rate depending on scheduling information.

In a wireless communication system, in a particular new radio (NR) system, a data rate supportable by a terminal may be agreed on between a base station and the terminal. This may be calculated using a maximum frequency band, a maximum modulation order, a maximum number of layers, and/or the like supported by the terminal. However, the calculated data rate may be different from a value calculated from a size of a transport block (TB)(a transport block size (TBS)) and a transmission time interval (TTI) used for actual data transmission.

Thus, the terminal may be assigned a larger TBS than a value corresponding to the data rate supported by the terminal and, to prevent this, a limit may be imposed on the TBS schedulable depending on the data rate supported by the terminal.

Figure 6:
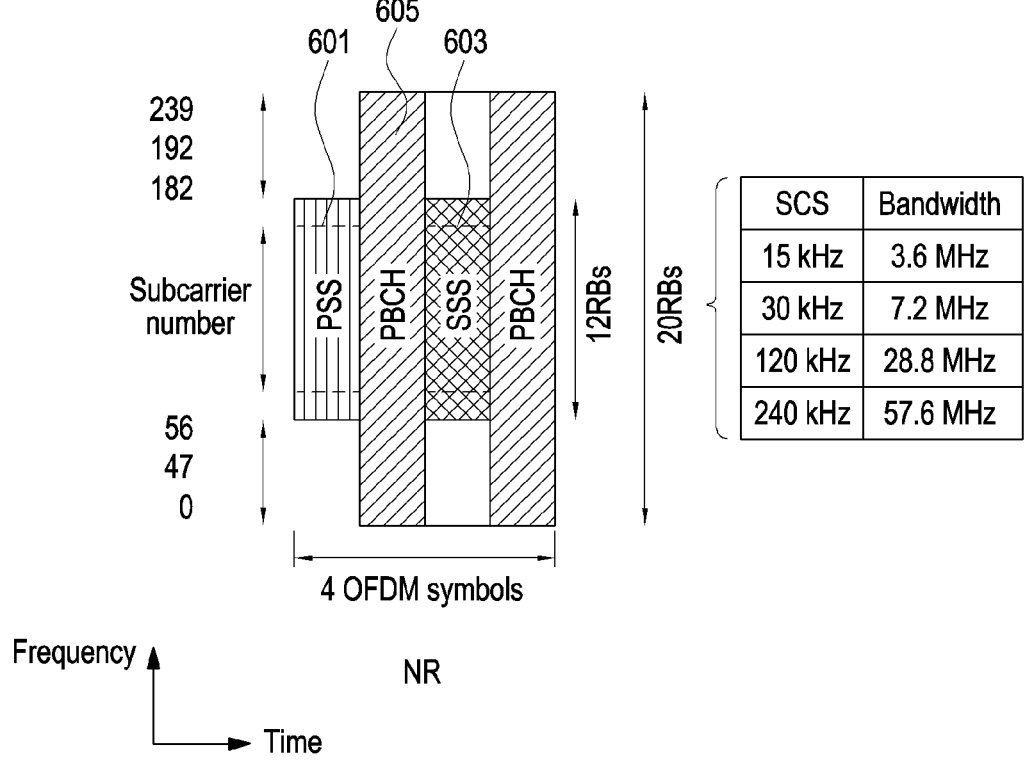
FIG. 6 is a diagram illustrating a state in which a synchronization signal and a physical broadcast channel of an NR system are mapped in a frequency and time domain.

FIG. 6 is a diagram illustrating an example in which a synchronization signal (SS) and a physical broadcast channel (PBCH) of an NR system are mapped in frequency and time domains.

A primary synchronization signal (PSS) 601, a secondary synchronization signal (SSS) 603, and a PBCH are mapped over 4 OFDM symbols, and the PSS and the SSS are mapped to 12 RBs, and the PBCH is mapped to 20 RBs. How a frequency band of 20 RBs changes according to subcarrier spacing (SCS) is illustrated a table in FIG. 6. A resource region in which the PSS, the SSS, and the PBCH are transmitted may be referred to as an SS/PBCH block. The SS/PBCH block may be referred to as an SSB block.

Figure 7:
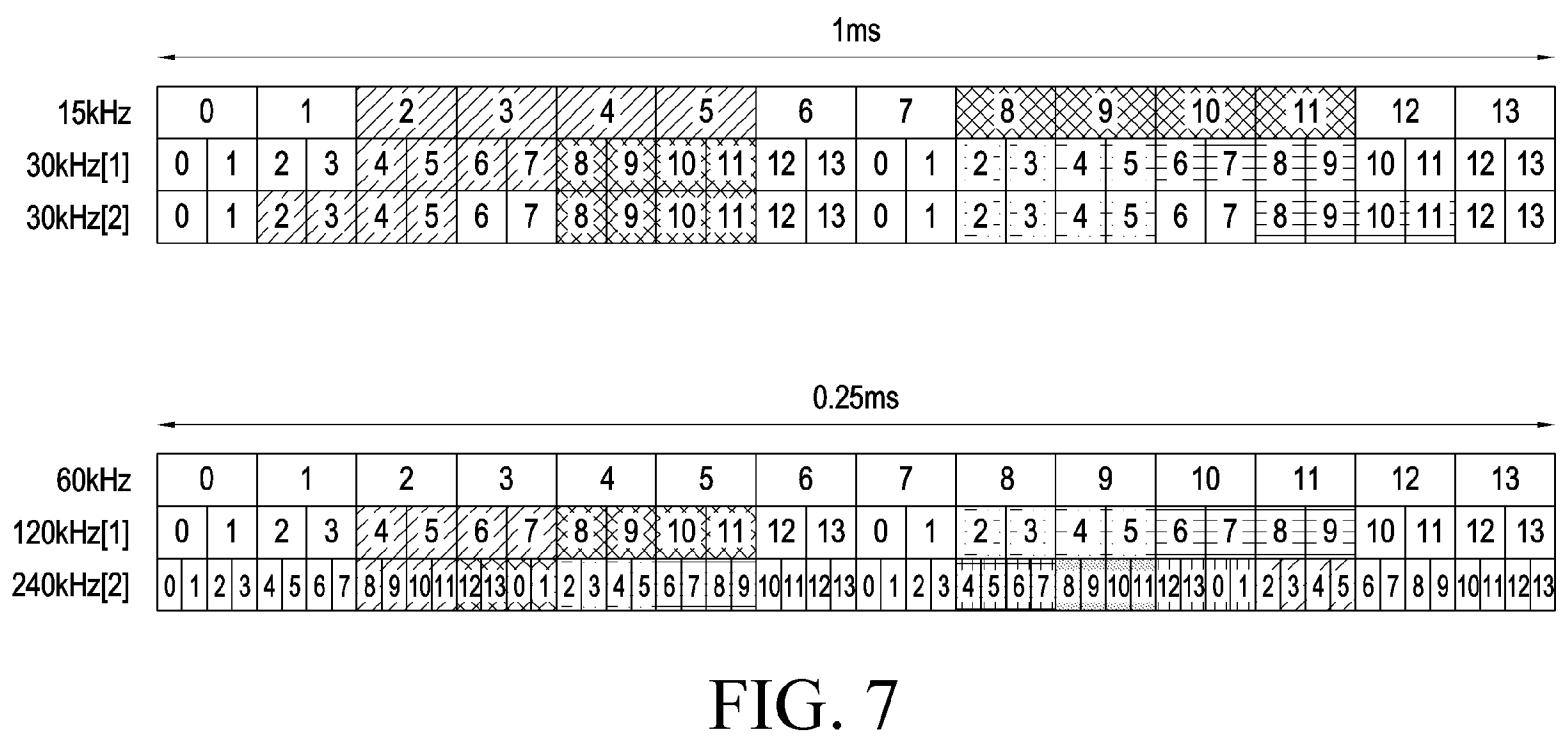

FIG. 7 is a diagram illustrating a symbol in which an SS/PBCH block may be transmitted according to subcarrier spacing.

Referring to FIG. 7, subcarrier spacing may be set to 15 kHz, 30 kHz, 120 kHz, 240 kHz, and/or the like, and a location of a symbol at which an SS/PBCH block (or an SSB block) may be located may be determined according to each subcarrier spacing. FIG. 7 illustrates a location of a symbol at which the SSB may be transmitted according to subcarrier spacing in symbols within 1 ms, and the SSB need not be always transmitted in a region shown in FIG. 7. The location at which the SSB block is transmitted may be configured in a terminal via system information or dedicated signaling.

Since the terminal is generally far from a base station, a signal transmitted from the terminal is received by the base station after propagation delay time (a propagation delay). The propagation delay time is a value obtained by dividing a path via which a radio wave is transmitted from the terminal to the base station by a speed of light, and may typically be a value obtained by dividing a distance between the terminal and the base station by the speed of light. In an embodiment, in a case of a terminal being located 100 km away from the base station, a signal transmitted from the terminal is received by the base station after about 0.34 msec. Contrary to this, a signal transmitted from the base station is also received by the terminal after about 0.34 msec. As described above, arrival time of the signal transmitted from the terminal to the base station may vary depending on a distance between the terminal and the base station. Therefore, when multiple terminals in different locations transmit signals simultaneously, time when the signals arrive at the base station may differ from each other. To allow the signals from the multiple terminals to simultaneously arrive at the base station by solving this problem, time to transmit a uplink signal may be rendered to differ according to a location per terminal. In 5G, NR and LTE systems, this is called timing advance.

Figure 8:
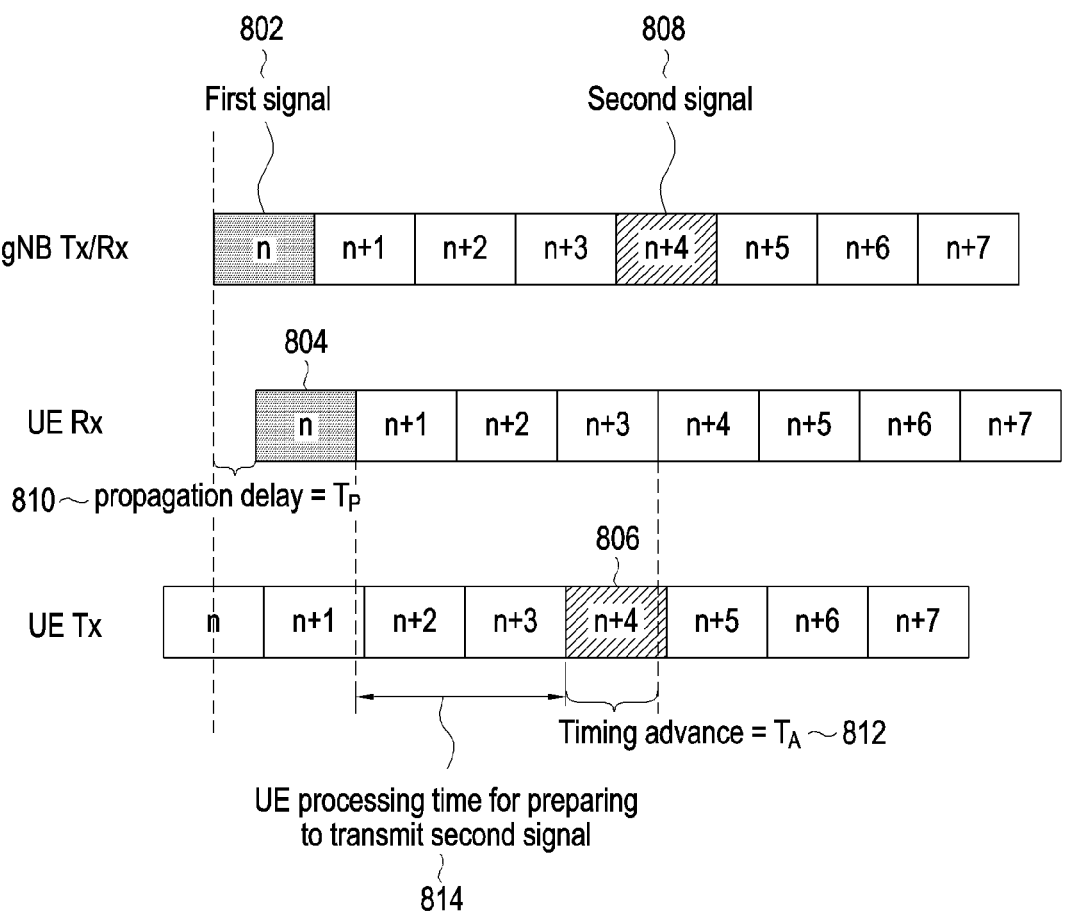
FIG. 8 is a diagram illustrating a processing time of a terminal according to a timing advance when the terminal receives a first signal and the terminal transmits a second signal in a 5G or NR system according to an embodiment disclosed herein.

FIG. 8 is a diagram illustrating processing time of a terminal according to a timing advance when the terminal receives a first signal and the terminal transmits a second signal in a 5G or NR system according to a disclosed embodiment.

Hereinafter, processing time of a terminal according to timing advance is described in detail. When a base station transmits an uplink scheduling grant (UL grant) or a downlink control signal and data (DL grant and DL data) to the terminal at slot n 802, the terminal may receive the uplink scheduling grant or the downlink control signal and the data at slot n 804. At this time, the terminal may receive the signal later by a propagation delay (Tp) 810 later than time at which the base station transmits the signal. In this embodiment, when the terminal receives a first signal at slot n 804, the terminal transmits a second signal at slot n+4 806. When the terminal transmits a signal to the base station, the terminal may transmit HARQ ACK/NACK for uplink data or downlink data at a timing 806 which is advanced by a timing advance (TA) 812 from the slot n+4 for the signal reference received by the terminal to allow the signal to arrive at the base station at specific time. Thus, in this embodiment, time during which the terminal may prepare to transmit uplink data after receiving uplink scheduling grant or the terminal may prepare to deliver HARQ ACK or NACK after receiving downlink data may be time excluding the TA from time which corresponds to three slots (814).

To determine the above-described timing, the base station may calculate an absolute value of the TA of the corresponding terminal. The base station may calculate the absolute value of the TA by adding to, or subtracting from, the TA value first delivered to the terminal in a random access phase when the terminal initially accesses the base station, variation in the subsequent TA delivered via higher layer signaling. In the disclosure, the absolute value of the TA may be a value obtained by subtracting start time of the nth TTI received by the terminal from start time of the nth TTI transmitted by the terminal.

Meanwhile, one of the important criteria for performance of a cellular wireless communication system is packet data latency. For this, in an LTE system, signal transmission/reception is performed in units of subframes which have a transmission time interval (TTI) of 1 ms. The LTE system operated as described above may support a terminal (short-TTI UE) having a transmission time interval shorter than 1 ms. Meanwhile, in a 5G or NR system, a transmission time interval may be shorter than 1 ms. A short-TTI terminal is suitable for services, such as voice over a LTE (VoLTE) service and a remote control service where latency is important. Further, the short-TTI terminal becomes a means capable of realizing mission-critical Internet of things (IoT) on a cellular basis.

In the 5G or NR system, when a base station transmits a PDSCH including downlink data, DCI to schedule the PDSCH indicates a K1 value, which is a value corresponding to information for timing when the terminal transmits HARQ-ACK information for the PDSCH. Unless it is instructed to transmit the HARQ-ACK information earlier than symbol L1 including timing advance, the terminal may transmit it to the base station. That is, the HARQ-ACK information may be transmitted from the terminal to the base station at the same time, or later than, the symbol L1 including the timing advance. When it is instructed to transmit the HARQ-ACK information earlier than the symbol L1 including the timing advance, the HARQ-ACK information may not be valid HARQ-ACK information in HARQ-ACK transmission from the terminal to the base station.

A symbol L1 may be the first symbol at which cyclic prefix (CP) begins after $T_{proc,1}$ from the last time point of the PDSCH. $T_{proc,1}$ may be calculated as in Equation 3 below.

$$T_{proc,1} = (N_1 + d_{1,1} + d_{1,2})(2048 + 144) \cdot \kappa 2^{-\mu} \cdot T_C \qquad \text{[Equation 3]}$$

In Equation 3 above, N1, d1,1, d1,2, K, μ, and TC may be defined as follows.

If HARQ-ACK information is transmitted on a PUCCH (a uplink control channel), d1,1=0, and if the HARQ-ACK information is transmitted on a PUSCH (a uplink shared channel, and a data channel), d1,1=1.

If the terminal is configured with a plurality of activated configuration carriers or carriers, a maximum timing difference between carriers may be reflected in the second signal transmission.

In a case of a PDSCH mapping type A, that is, in a case that a location of the first DMRS symbol is the third or fourth symbol of a slot, if a location index i of the last symbol of the PDSCH is less than 7, it is defined that d1,2=7−i.

In a case of a PDSCH mapping type B, that is, in a case that the location of the first DMRS symbol is the first symbol of the PDSCH, if a length of the PDSCH is 4 symbols, d1,2=3, and if the length of the PDSCH is 2 symbols, d1,2=3+d, where d is the number of symbols in which the PDSCH and a PDCCH including a control signal to schedule the corresponding PDSCH overlap.

N1 is defined as in Table 17 below according to μ. μ=0, 1, 2, and 3 mean subcarrier spacing is 15 kHz, 30 kHz, 60 kHz, and 120 kHz, respectively.

TABLE 17

| | PDSCH decoding time $N_1$ [symbols] | |
| --- | --- | --- |
| μ | No additional PDSCH DMRS configured | additional PDSCH DMRS configured |
| 0 | 8 | 13 |
| 1 | 10 | 13 |
| 2 | 17 | 20 |
| 3 | 20 | 24 |

For an N1 value provided in Table 17 above, a different value may be used according to UE capability.

The following definitions are used:

$T_c = 1/(\Delta f_{max} \cdot N_f)$, $\Delta f_{max} = 480 \cdot 10^3$ Hz, $N_f = 4096$, $\kappa = T_s/T_c = 64$, $T_s = 1/(\Delta f_{ref} \cdot N_{f,ref})$, $\Delta f_{ref} = 15 \cdot 10^3$ Hz, $N_{f,ref} = 2048$ Further, in the 5G or NR system, when the base station transmits control information including an uplink scheduling grant, a K2 value corresponding to information for a timing when the terminal transmits uplink data or a PUSCH may be indicated.

Unless it is instructed to transmit a PUSCH earlier than symbol L2 including timing advance, the terminal may transmit it to the base station. That is, the PUSCH may be transmitted from the terminal to the base station at the same time, or later than, the symbol L2 including the timing advance. If it is instructed to transmit the PUSCH earlier than symbol L2 including the timing advance, the terminal may disregard uplink scheduling grant control information from the base station.

Symbol L2 may be the first symbol at which a CP of a PUSCH symbol, which needs to be transmitted after $T_{proc,2}$ from the last time point of the PDCCH including a scheduling grant, begins. $T_{proc,2}$ may be calculated as in Equation 4 below.

$$T_{proc,2}=(N_2+d_{2,1})(2048+144)\cdot\kappa 2^{-\mu}\cdot T_C \quad \text{[Equation 4]}$$

In Equation 4 above, N2, d2,1, K, μ, and TC may be defined as follows.

If the first symbol among PUSCH-allocated symbols includes only a DMRS, d2,1=0, otherwise d2,1=1.

If the terminal is configured with a plurality of activated configuration carriers or carriers, a maximum timing difference between carriers may be reflected in the second signal transmission.

N2 is defined as in Table 18 below according to μ. μ=0, 1, 2, and 3 mean subcarrier spacing is 15 kHz, 30 kHz, 60 kHz, and 120 kHz, respectively.

TABLE 18

| μ | (PUSCH preparation time) $N_2$ [symbols] |
|---|---|
| 0 | 10 |
| 1 | 12 |
| 2 | 23 |
| 3 | 36 |

For an N2 value provided in Table 18 above, a different value may be used according to UE capability.

The following definitions are used:

$T_c=1/(\Delta f_{max}\cdot N_f)$, $\Delta f_{max}=480\cdot 10^3$ Hz, $N_f=4096$, $\kappa=T_s/T_c=64$, $T_s=1/(\Delta f_{ref}\cdot N_{f,ref})$, $\Delta f_{ref}=15\cdot 10^3$ Hz, $N_{f,ref}=2048$ Meanwhile, a 5G or NR system may configure a frequency band part (BWP) within one carrier to designate a specific terminal to transmit and receive within the configured BWP. This may be so intended to reduce power consumption of the terminal. A base station may configure a plurality of BWPs, and may change an activated BWP in control information. Time which the terminal may use when a BWP is changed may be defined as shown in Table 19 below.

TABLE 19

| Frequency Range | Scenario | Type 1 delay (μs) | Type 2 delay (μs) |
|---|---|---|---|
| 1 | 1 | 600 | 2000 |
| | 2 | 600 | 2000 |
| | 3 | 600 | 2000 |
| | 4 | 400 | 950 |
| 2 | 1 | 600 | 2000 |
| | 2 | 600 | 2000 |
| | 3 | 600 | 2000 |
| | 4 | 400 | 950 |

In Table 19, a Frequency Range 1 means a frequency band equal to or lower than 6 GHz, and a Frequency Range 2 means a frequency band equal to or higher than 6 GHz. In the above-described embodiment, a type 1 and a type 2 may be determined according to UE capability. Scenarios 1, 2, 3, and 4 in the above-described embodiment are given as illustrated in Table 20 below.

TABLE 20

| | Center frequency variable | Center frequency fixed |
|---|---|---|
| Frequency bandwidth variable | Scenario 3 | Scenario 2 |
| Frequency bandwidth fixed | Scenario 1 | Scenario 4 if subcarrier spacing is changed |

Figure 9:
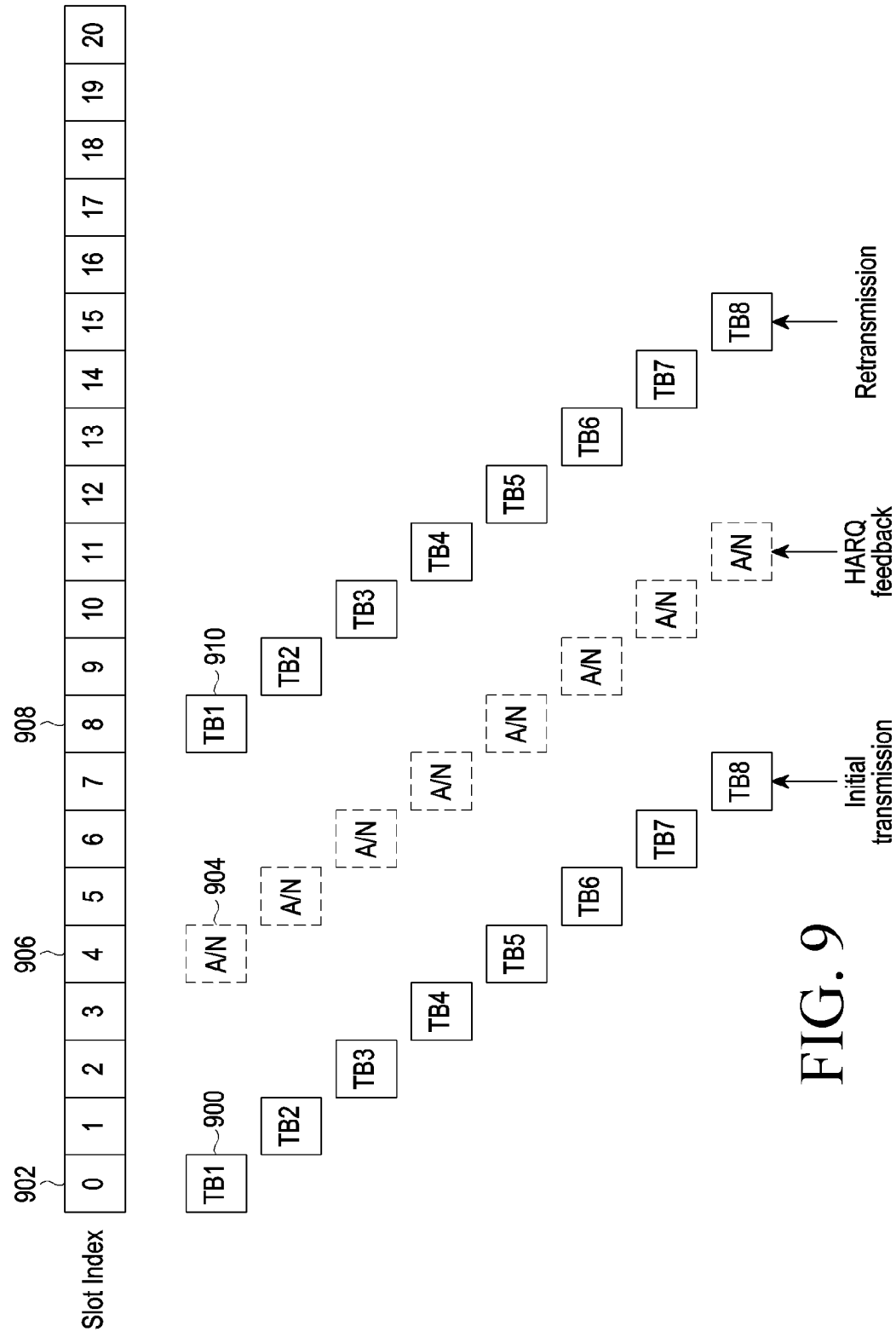
FIG. 9 is a diagram illustrating an example in which data (e.g., a TB) is scheduled and transmitted according to a slot, an HARQ-ACK feedback for the corresponding data is received, and retransmission is performed according to the feedback.

FIG. 9 is a diagram illustrating an example in which data (e.g., TBs) are scheduled and transmitted according to a slot, an HARQ-ACK feedback for the corresponding data is received, and retransmission is performed according to the feedback. In FIG. 9, a TB1 900 is initially transmitted in slot 0 902, and an ACK/NACK feedback 904 therefor is transmitted in slot 4 906. If the initial transmission of the TB1 fails and NACK is received, retransmission 910 for the TB1 may be performed in slot 8 908. In the above, a time point at which the ACK/NACK feedback is transmitted and a time point at which the retransmission is performed may be predetermined or may be determined according to a value indicated by control information and/or higher layer signaling.

FIG. 9 illustrates an example in which the TB1 to TB8 are sequentially scheduled and transmitted from the slot 0 according to a slot. For example, TB1 to TB8 may be transmitted, with HARQ process ID 0 to HARQ process ID 7 assigned thereto. If only four HARQ process IDs may be used by a base station and a terminal, it may be impossible to consecutively transmit eight different TBs.

Meanwhile, various embodiments of the disclosure propose various schemes for a groupcast service or a multicast service, which are described in detail as follows.

In various embodiments of the disclosure, a case that one terminal transmits the same data to a plurality of terminals or a case that a base station transmits the same data to a plurality of terminals is referred to as groupcast or multicast, and in various embodiments of the disclosure, it should be noted that the terms "groupcast" and "multicast" may be interchangeably used.

Further, in various embodiments of the disclosure, the term "base station (BS)" may refer to any component (or a set of components) configured to provide wireless access, such as a transmit point (TP), a transmit-receive point (TRP), an enhanced node B (eNodeB or eNB), a 5G base station (gNB), a macrocell, a femtocell, Wi-Fi access point (AP), or other wireless-enabled devices, based on a type of a wireless communication system. Base stations may provide wireless access according to one or more radio protocols, e.g., 5G 3GPP new radio interface/access (NR), long-term evolution (LTE), LTE advanced (LTE-A), high-speed packet access (HSPA), Wi-Fi 802.11 a/b/g/n/ac, and/or the like.

Further, in various embodiments of the disclosure, the term "terminal" may refer to any component, such as "user equipment (UE)," "mobile station," "subscriber station," "remote terminal," "wireless terminal," "receive point," or "user device." For convenience, in various embodiments of the disclosure, the term "terminal" is used to refer to a device that accesses a base station regardless of whether it needs to be considered as a mobile device (such as a mobile phone or a smart phone) or a fixed device (such as a desktop computer or vending machine).

An example of a signal transmission/reception scheme for a groupcast service in a wireless communication system according to various embodiments will be described below with reference to FIG. 10.

Figure 10:
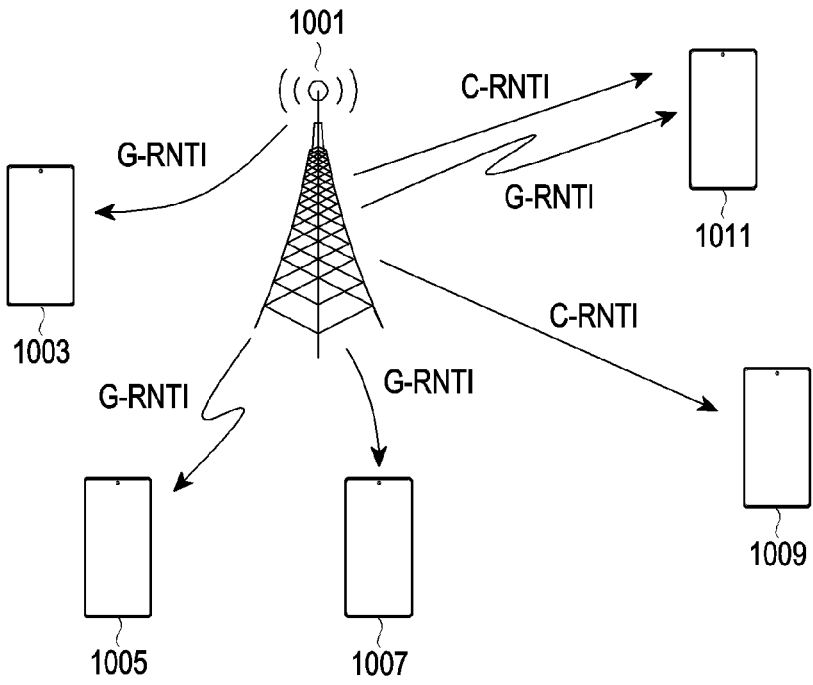
FIG. 10 is a diagram schematically illustrating an example of a signal transmission/reception scheme for a groupcast service in a wireless communication system according to various embodiments of the disclosure.

FIG. 10 is a diagram schematically illustrating an example of a signal transmission/reception scheme for a groupcast service in a wireless communication system according to various embodiments.

An example of groupcast in which a base station 1001 transmits the same control information and the same data to a plurality of terminals, e.g., terminals 1003, 1005, 1007, and 1011 will be described in FIG. 10. The base station informs a G-RNTI, which may be used to receive control information for groupcast, to the terminals 1003, 1005, 1007, and 1011 via a system information block (SIB, hereinafter, will be referred to as "SIB"), preset information, a preset message, and/or the like. Here, the G-RNTI is a group radio network temporary identifier (G-RNTI).

Each of the terminals 1003, 1005, 1007, and 1011 may receive the G-RNTI transmitted from the base station 1001 and receive control information for groupcast using the G-RNTI. The G-RNTI may be scrambled to a cyclic redundancy check (CRC) of the control information for the groupcast, e.g., downlink control information (DCI), and transmitted.

In FIG. 10, a terminal 1009 may access the base station 1001 and receive a cell radio network temporary identifier (C-RNTI, hereinafter "C-RNTI") from the base station 1001. The terminal 1011 may access the base station 1001 and may receive the C-RNTI and the G-RNTI for the groupcast from the base station 100.

A case that the same control information and data are transmitted and one or more terminals may receive the same control information and data may be referred to as groupcast for the control information and data. Further, a case that a C-RNTI or a terminal-specific RNTI is received by a terminal, e.g., the terminal 1009 or the terminal 1011, and only specific terminals may receive control information and data using the C-RNTI or the terminal-specific RNTI may be referred to as unicast for the control information and data in FIG. 10.

In various embodiments of the disclosure, a terminal may be configured to receive a control channel signal and a data channel signal for groupcast from a transmit end A, and to receive a control channel signal and a data channel signal for unicast from a transmit end B. In various embodiments of the disclosure, the transmit end A and the transmit end B may be the same or different transmit ends. In various embodiments of the disclosure, each of the transmit end A and the transmit end B may be a base station, a vehicle, or a general terminal.

A case that each of the transmit end A and the transmit end B is the base station may be a case that groupcast data and unicast data may be delivered from the base station, that is, may be transmitted via a Uu link.

Alternatively, if each of the transmit end A and the transmit end B is the vehicle or the general terminal, the groupcast transmission and the unicast transmission may be sidelink transmission. At this time, each of the transmit end A and the transmit end B may be a terminal operating as a leader node or an anchor node in a corresponding group, may perform groupcast transmission for at least one other terminal within the corresponding group, and may perform an operation of receiving control information from the at least one other terminal. In various embodiments of the disclosure, the transmit end A may be the vehicle, and the transmit end B may be the base station. Although various embodiments of the disclosure are described under the assumption that the transmit end A and the transmit end B are a single transmit end, various embodiments of the disclosure may also be applied even if the transmit end A and the transmit end B are different transmit ends.

The terminal may receive, or receive, from the base station or another terminal in the group (here, the other terminal in the group may be the leader node), an RNTI (in the following description, it should be noted that the RNTI corresponding to a unique ID may be interchangeably used with a G-RNTI or a group-common RNTI, a group identifier, and/or the like, for receiving a control channel signal and a data channel signal for groupcast) corresponding to a unique identifier (ID) for receiving a control channel signal and a data channel signals for the groupcast. The terminal may receive the control channel signal for the groupcast using the G-RNTI, and may receive the data channel signal based on the control channel signal for the groupcast.

In various embodiments of the disclosure, a control channel for data scheduling may be interchangeably used with a physical downlink control channel (PDCCH, hereinafter, will be referred to as "PDCCH") or a physical sidelink control channel (PSCCH, hereinafter, will be referred to as "PSCCH"), a data channel may be interchangeably used with a physical downlink shared channel (PDSCH, hereinafter, will be referred to as "PDSCH") or a physical sidelink shared channel (PSSCH, hereinafter, will be referred to as "PSSCH"), and a feedback channel may be interchangeably used with a physical uplink control channel (PUCCH, hereinafter, will be referred to as "PUCCH") or PSCCH. In various embodiments of the disclosure, although control information for scheduling, received by the terminal, is assumed to be DCI as an example, the control information for scheduling may be implemented in other various forms than the DCI.

In various embodiments of the disclosure, a case that one terminal transmits the same data to a plurality of terminals or a case that a base station transmits the same data to a plurality of terminals may be referred to as groupcast or multicast. It should be noted that in various embodiments of the disclosure, the term "groupcast" may be used interchangeably with "multicast".

In addition, in various embodiments of the disclosure, "data" may include a transport block (TB) delivered via a shared channel such as PDSCH, PUSCH, PSSCH, and/or the like.

According to various embodiments of the disclosure, signal transmission/reception schemes for groupcast or multicast according to the following three embodiments are proposed, which will be described in detail as follows.

First Embodiment

The first embodiment of the disclosure proposes a method and apparatus in which terminals transmits, to a base station or a transmitter, hybrid automatic repeat request (HARQ, hereinafter, referred to as "HARQ") feedback information (for example, HARQ-acknowledgement (HARQ-ACK), hereinafter, referred to as "HARQ-ACK") if data for groupcast is transmitted to the terminals.

First, the base station may provide an RNTI which may be used to receive control information for groupcast to the terminals via, for example, an SIB. Here, a plurality of RNTIs may be provided via the SIB, and each of the plurality of RNTIs may have a different purpose. For example, an arbitrary RNTI may be for an RNTI for a specific broadcast or may be an RNTI for a specific emergency situation, and in this case, value thereof may be set differently.

Alternatively, the base station may configure an RNTI for groupcast to specific terminals via higher layer signaling such as radio resource control (RRC, hereinafter, referred to as "RRC") or medium access control (MAC, hereinafter, referred to as "MAC") control element, and/or the like. Configuring the RNTI for groupcast to the specific terminals via the higher layer signaling in this way may be to transmit data for groupcast only to terminals in RRC connected (RRC_connected, hereinafter, referred to as "RRC_connected") mode. In various embodiments of the disclosure, the term "RRC_connected mode" may mean a state in which a terminal receives a C-RNTI from the base station and accesses the base station after completing an initial access procedure and a random access procedure.

Upon providing control information and data for groupcast to the terminals in the RRC_connected mode as described above, the base station may receive feedback information for the control information and data for the groupcast from the terminals in the RRC_connected mode. In various embodiments of the disclosure, for example, HARQ feedback information based on a distance or received energy, for example, reference signal received power (RSRP, hereinafter, referred to as "RSRP"), and/or the like may be transmitted/received.

Next, another example of a signal transmission/reception scheme for a groupcast service in a wireless communication system according to various embodiments of the disclosure will be described with reference to FIG. 11.

Figure 11:
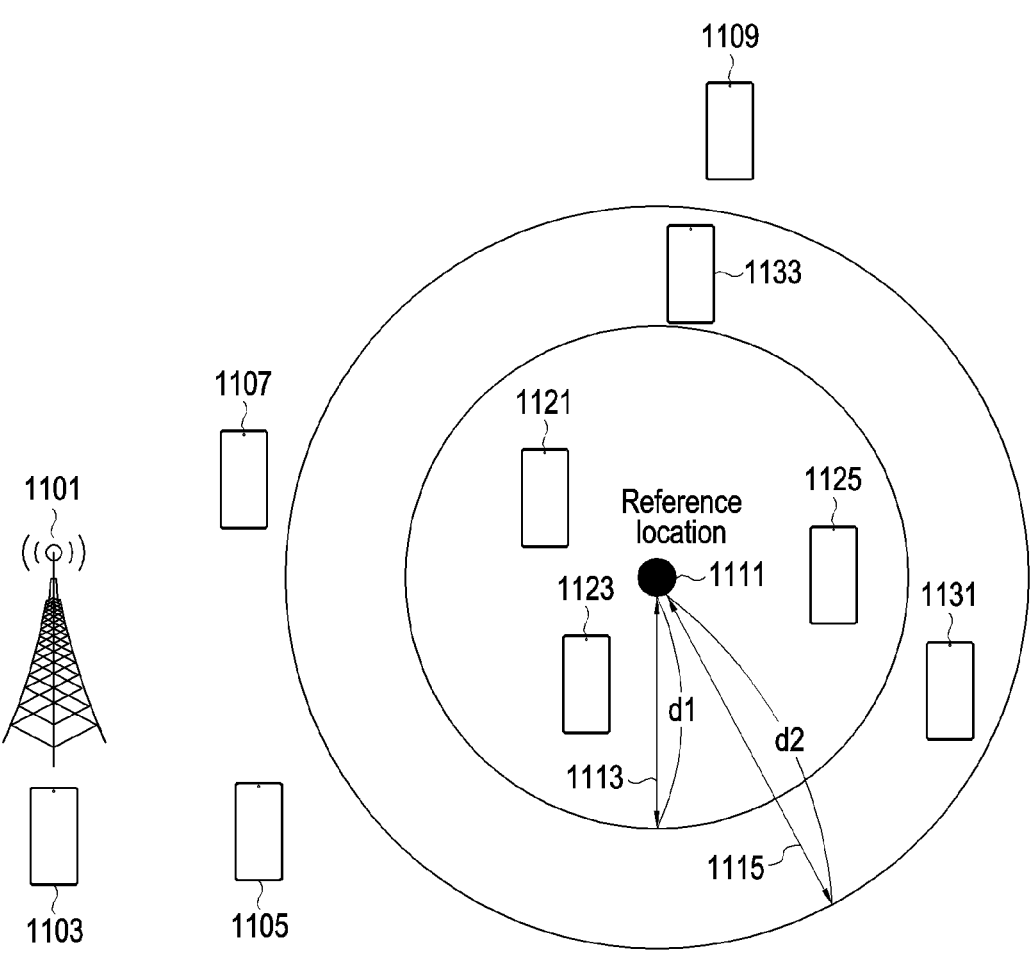
FIG. 11 is a diagram schematically illustrating another example of a signal transmission/reception scheme for a groupcast service in a wireless communication system according to various embodiments of the disclosure.

FIG. 11 is a diagram schematically illustrating another example of a signal transmission/reception scheme for a groupcast service in a wireless communication system according to various embodiments of the disclosure.

Referring to FIG. 11, a base station 1101 may provide data for groupcast to a plurality of terminals 1103, 1105, 1107, 1109, 1121, 1123, 1125, 1131, and 1133. Each of the terminals 1103, 1105, 1107, 1109, 1121, 1123, 1125, 1131, and 1133 may be a terminal in an RRC_connected mode, a terminal in an RRC_inactive (hereinafter, referred to as "RRC_inactive") mode, or a terminal in an RRC_idle (hereinafter, referred to as "RRC_idle") mode.

In various embodiments of the disclosure, the terminal may transmit HARQ feedback information or uplink data to the base station based on a distance or received energy, for example, RSRP, and/or the like during transmission/reception of downlink or uplink data. For example, the base station 1101 may transmit information indicating a reference location 1111 to the terminal via higher layer signaling or SIB signaling. As another example, the base station 1111 may transmit information indicating the reference location 1111 via the control information for groupcast, for example, DCI. Here, the reference location 1111 may be expressed as, for example, coordinate information, and of course, it may be expressed in any form which may represent the reference location 1111.

In addition, a threshold value (threshold) may be included in the DCI for groupcast, and the threshold value may be used to compare with a distance or received energy for determining whether the terminal transmits HARQ feedback information. For example, if whether to transmit the HARQ feedback information is determined based on the distance, the threshold value may be set, for example, based on a separation distance from the reference location, and for example, the threshold value may be set to d1 or d2. Here, d1 may indicate that terminals existing at a distance less than d1 from the reference location 1111 need to transmit HARQ feedback information, and d2 may indicate that terminals existing at a distance less than d2 from the reference location 1111 need to transmit HARQ feedback information. Alternatively, d1 may indicate that terminals existing at a distance of d1 or more from the reference position 1111 need to transmit HARQ feedback information, and d2 may indicate that terminals existing at a distance of d2 or more from the reference position 1111 need to transmit HARQ feedback information.

As another example, if whether to transmit the uplink data is determined based on the distance, d1 may indicate that it is possible for the terminals existing at the distance less than d1 from the reference location 1111 to transmit the uplink data, and d2 may indicate that it is possible for the terminals existing at the distance less than d2 from the reference location 1111 to transmit the uplink data. Alternatively, d1 may indicate that it is possible for the terminals existing at the distance of d1 or more from the reference location 1111 to transmit the uplink data, and d2 may indicate that it is possible for the terminals existing at the distance of d2 or more from the reference location 1111 to transmit the uplink data.

Here, a location spaced apart from the reference location 1111 by d1 is, for example, a location 1113, and a location spaced apart from the reference location 1111 by d2 is, for example, a location 1115. In various embodiments of the disclosure, a scheme for a terminal to detect a location of the terminal may be implemented in various forms, and detailed description thereof will be omitted.

In various embodiments of the disclosure, for example, it has been described as determining whether to transmit HARQ feedback information or uplink data based on a distance, but whether to transmit several uplink signals such as not only the HARQ feedback information or uplink data but also a scheduling request (SR, hereinafter, referred to as "SR"), a buffer status report (BSR, hereinafter, referred to as "BSR"), and/or the like may be determined in a manner similar to a scheme of determining whether to transmit the HARQ feedback information or uplink data.

Meanwhile, in various embodiments of the disclosure, downlink control information, for example DCI, may include at least one of the following bit fields.

(1) Reference location field: may include reference location information indicating a location for a receiver to identify whether to transmit HARQ feedback information or uplink data using a distance or received energy, for example, RSRP. For example, in FIG. 11, location information corresponding to the reference location 1111 may be included.

(2) Threshold distance (threshold value) field: may include information indicating a threshold distance value (a threshold value) used for a receiver to compare with a distance calculated using the receiver's own location information and reference location information. The threshold distance field may include, for example, a distance value such as 100 m, 1 km, and/or the like. The threshold distance value included in the threshold distance field may include one of distance values delivered via higher layer signaling, an SIB, and/or the like.

(3) Inner/outer indicator field: may include an indicator indicating whether a receiver transmits HARQ feedback information, uplink data, and/or the like if a distance calculated using the receiver's own location information and reference location information is longer than or equal to an indicated threshold distance or whether the receiver transmits the HARQ feedback information, the uplink data, and/or the like if the distance calculated using the receiver's own location information and the reference location information is shorter than the threshold distance, when the receiver compares the distance calculated using the receiver's own location information and the reference location information with the threshold distance, and transmits the HARQ feedback information, the uplink data, and/or the like based on compared result thereof.

For example, if an inner indicator (hereinafter, referred to as an "inner indicator") value is included in the inner/outer indicator field, only terminals located at a distance less than the threshold distance from the reference location may transmit HARQ feedback information or uplink data. On the other hand, if an outer indicator (hereinafter, referred to as an "outer indicator") value is included in the inner/outer indicator field, only terminals located at a distance longer than or equal to the threshold distance from the reference location may transmit HARQ feedback information or uplink data.

Second Embodiment

In the first embodiment of signal transmission/reception schemes for groupcast or multicast, a method and apparatus, in which terminals transmits, to a base station or a transmitter, HARQ feedback information if data for groupcast is transmitted to the terminals, have been described.

Additionally, the second embodiment of signal transmission/reception schemes for groupcast or multicast provides a method and apparatus for what data terminals will receive and how to transmit HARQ feedback information for the received data if data for groupcast is transmitted to the terminals, and if the terminals are RRC_connected terminals, and the terminals receive data for unicast or broadcast along with the data for the groupcast. Hereinafter, for convenience of description, data for groupcast will be referred to as "groupcast data", and data for unicast will be referred to as "unicast data". In addition, control information for groupcast will be referred to as "groupcast control information", and control information for unicast will be referred to as "unicast control information".

In various embodiments of the disclosure, prioritizing reception of specific data may mean decoding the specific data and not decoding data other than the specific data. Here, decoding data may include a process of demodulating the data and storing a calculated log likelihood ratio (LLR, hereinafter, referred to as "LLR") value in a soft buffer. Alternatively, decoding the data may include a process of transmitting HARQ feedback information for the data, not transmitting HARQ feedback information for data other than the data, or feeding back an arbitrary value for the data other than the data.

In various embodiments of the disclosure, groupcast data and unicast data may be classified according to a bit field of DCI or may be classified according to an RNTI value scrambled to CRC of the DCI. In various embodiments of the disclosure, processing for groupcast data and unicast data will be described as an example, but this may be similarly applied to processing for groupcast control information and unicast control information.

In various embodiments of the disclosure, for example, if groupcast DCI and unicast DCI are received at the same time or in the same slot, in determining which DCI among the groupcast DCI and the unicast DCI to be decoded preferentially, the following various methods may be considered.
(1) Method A1
If groupcast data and unicast data are simultaneously received by a terminal, the unicast data may always be prioritized over the groupcast data. The reason is that, due to scheduling of a base station, simultaneous transmission of the unicast data and the groupcast data may mean that there is important information to be transmitted to a terminal which will receive the unicast data. If the unicast data is not prioritized, there is no reason for the base station to transmit unicast, so a case of simultaneously transmitting the unicast data and the groupcast data may not occur.
(2) Method A2
If groupcast data and unicast data are simultaneously received by a terminal, the groupcast data may always be prioritized over the unicast data. This case may be, for example, transmission of an emergency message in which processing of groupcast data is prioritized.
(3) Method A3
If groupcast data and unicast data are simultaneously received by a terminal, it may be configured which one of the groupcast data and the unicast data is prioritized via, for example, higher layer signaling.
(4) Method A4
If groupcast data and unicast data are simultaneously received by a terminal, it may be determined which one of the groupcast data and the unicast data is prioritized based on an indicator included in DCI. For example, an indicator indicating a quality of service (QoS) value or a priority value may be included in DCI for groupcast, and a threshold value for QoS or a threshold value for a priority may be configured via higher layer signaling. Here, the indicator indicating the QoS value will be referred to as a "QoS indicator", and the indicator indicating the priority value will be referred to as a "priority indicator". In addition, the threshold value for the QoS value will be referred to as a "QoS threshold value", and the threshold value for the priority will be referred to as a "priority threshold value".

For example, the terminal receiving the group cast data and the unicast data simultaneously may compare the QoS threshold value with the QoS value indicated by the QoS indicator included in the DCI for the group cast, and based on comparison result thereof, may determine whether to preferentially process the groupcast data.

Alternatively, both DCI for groupcast and DCI for unicast may include a QoS indicator. In this case, a QoS value indicated by the QoS indicator included in the DCI for the groupcast is compared with a QoS value indicated by the QoS indicator included in the DCI for the unicast, and based on comparison result thereof, it may be determined to preferentially process which one of the groupcast data and the unicast data.

As another example, the terminal simultaneously receiving the group cast data and the unicast data may compare the priority threshold value with a priority value indicated by the priority indicator included in the DCI for the group cast, and based on comparison result thereof, may determine to preferentially process the groupcast data.

Alternatively, both the DCI for the groupcast and the DCI for the unicast may include a priority indicator. In this case, a priority value indicated by the priority indicator included in the DCI for the groupcast may be compared with a priority value indicated by the priority indicator included in the DCI for the unicast, and based on comparison result thereof, it may be determined to preferentially process which one of the groupcast data and the unicast data.
(5) Method A5
If groupcast data and unicast data are simultaneously received by a terminal, it may be differently determined which one of the groupcast data and the unicast data is prioritized according to whether it is semi-persistent scheduling (SPS, hereinafter, referred to as "SPS") or configured grant (CG, hereinafter, referred to as "CG") scheduling.

The SPS or CG scheduling may be a case that scheduling information is transmitted in advance via higher layer signaling, and transmission is started by triggering while indicating a scheduling resource, a transmission time point, and/or the like via DCI, or transmission of data is started without transmitting the DCI. Contrary to this, dynamic scheduling may be a mode scheduled by providing information such as a transmission resource, a transmission time point, a modulation and coding scheme (MCS, hereinafter, referred to as "MCS"), a HARQ process ID, and/or the like via DCI whenever data is transmitted.

For example, if CG scheduling is performed on unicast data, the unicast data is transmitted based on the CG scheduling, dynamic scheduling is performed on groupcast data at the same time, and the groupcast data is transmitted via DCI based on the dynamic scheduling, a terminal may simultaneously receive the unicast data on which the CG scheduling is performed and the groupcast data on which the dynamic scheduling is performed. In this case, it is possible for the terminal to prioritize the dynamic scheduling over the CG scheduling to preferentially process the groupcast data on which the dynamic scheduling is performed.

Alternatively, if CG scheduling is performed on groupcast data, the groupcast data is transmitted based on the CG scheduling, dynamic scheduling is performed on unicast data at the same time, and the unicast data is transmitted via DCI based on the dynamic scheduling, a terminal may simultaneously receive the groupcast data on which the CG scheduling is performed and the unicast data on which the dynamic scheduling is performed. In this case, it is possible for the terminal to prioritize the dynamic scheduling over the CG scheduling to preferentially process the unicast data on which the dynamic scheduling is performed.

(6) Method A6

If groupcast data and unicast data are simultaneously received by a terminal, it may be determined which one of the groupcast data and the unicast data is prioritized according to whether HARQ feedback information is transmitted. For example, if transmission of HARQ feedback information for the groupcast data is disabled, processing of the groupcast data may not be prioritized. Contrary to this, if transmission of HARQ feedback information for the unicast data is disabled, processing of the unicast data may not be prioritized. That is, the method A6 may be a method of processing data whose HARQ feedback information needs to be transmitted first.

Meanwhile, a QoS value or a priority value to be applied in embodiments of the disclosure may be transmitted via, for example, a QoS parameter called a 5G QoS identifier (5QI, hereinafter, referred to as "5QI") in a 5G system. A resource type, a default priority level, a packet delay budget, a packet error rate, a default maximum data burst volume, a default averaging window, etc. may be mapped to one 5QI value, and it may be defined as shown in Table 21 below.

TABLE 21

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 (NOTE 14) | | 30 | 50 ms (NOTE 11, NOTE 13) | $10^{-3}$ | N/A | 2000 ms | Real Time Gaming, V2X messages Electricity distribution - medium voltage, Process automation - monitoring |
| 4 | | 50 | 300 ms (NOTE 11, NOTE 13) | $10^{-6}$ | N/A | 2000 ms | Non-Conver sational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g., MCPTT) |
| 66 (NOTE 12) | | 20 | 100 ms (NOTE 10, NOTE 13) | $10^{-2}$ | N/A | 2000 ms | Non-Mission- Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |

TABLE 21-continued

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 71 | | 56 | 150 ms (NOTE 11, NOTE 15) | $10^{-6}$ | N/A | 2000 ms | "Live" Uplink Streaming (e.g. TS 26.238 [76]) |
| 72 | | 56 | 300 ms (NOTE 11, NOTE 15) | $10^{-4}$ | N/A | 2000 ms | "Live" Uplink Streaming (e.g. TS 26.238 [76]) |
| 73 | | 56 | 300 ms (NOTE 11, NOTE 15) | $10^{-8}$ | N/A | 2000 ms | "Live" Uplink Streaming (e.g. TS 26.238 [76]) |
| 74 | | 56 | 500 ms (NOTE 11, NOTE 15) | $10^{-8}$ | N/A | 2000 ms | "Live" Uplink Streaming (e.g. TS 26.238 [76]) |
| 75 | | 56 | 500 ms (NOTE 11, NOTE 15) | $10^{-4}$ | N/A | 2000 ms | "Live" Uplink Streaming (e.g. TS 26.238 [7 61) |
| 5 | Non-GBR (NOTE 1) | 10 | 100 ms NOTE 10, NOTE 13) | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www. e-mail, chat, ftp, p2p file sharing, progressive Streaming) Interactive Gaming |
| 8 | | 80 | 300 ms (NOTE 13) | $10^{-6}$ | N/A | N/A | Video (Buffered Streaming) TCP-based (e.g., www, e-mail, chat, ftp, p2p file sharing, progressive video, etc.) |
| 9 | | 90 | | | | | |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5Q1 6/8/9) |
| 79 | | 65 | 50 ms (NOTE 10, NOTE 13) | $10^{-2}$ | N/A | N/A | V2X messages |
| 80 | | 68 | 10 ms (NOTE 5, NOTE 10) | $10^{-6}$ | N/A | N/A | Low Latency eMBB applications Augmented Reality |
| 82 | Delay Critical GBR | 19 | 10 ms (NOTE 4) | $10^{-4}$ | 255 bytes | 2000 ms | Discrete Automation (see TS 22.261 [2]) |
| 83 | | 22 | 10 ms (NOTE 4) | $10^{-4}$ | 1354 bytes (NOTE 3) | 2000 ms | Discrete Automation (see TS 22.261 [2]) |

TABLE 21-continued

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 84 | | 24 | 30 ms (NOTE 6) | $10^{-5}$ | 1354 bytes (NOTE 3) | 2000 ms | Intelligent transport systems (see TS 22.261 [2 |
| 85 | | 21 | 5 ms (NOTE 5) | $10^{-5}$ | 255 bytes | 2000 ms | Electricity Distribution-high voltage (see TS 22.261 [2]) |

NOTE 1:
A packet which is delayed more than PDB is not counted as lost, thus not included in the PER.
NOTE 2:
It is required that default MDBV is supported by a PLMN supporting the related 5QIs.
NOTE 3:
This MDBV value is set to 1354 bytes to avoid IP fragmentation for the IPv6 based, IPSec protected GTP tunnel to the 5G-AN node (the value is calculated as in Annex C of TS 23.060 [56] and further reduced by 4 bytes to allow for the usage of a GTP-U extension header).
NOTE 4:
A delay of 1 ms for the delay between a UPF terminating N6 and a 5G-AN should be subtracted from a given PDB to derive the packet delay budget that applies to the radio interface. When a dynamic CN component of the PDB is used, see clause 5.7.3.4.
NOTE 5:
A delay of 2 ms for the delay between a UPF terminating N6 and a 5G-AN should be subtracted from a given PDB to derive the packet delay budget that applies to the radio. interface. When a dynamic CN component of the PDB is used, see clause 5.7.3.4.
NOTE 6:
A delay of 5 ms for the delay between a UPF terminating N6 and a 5G-AN should be subtracted from a given PDB to derive the packet delay budget that applies to the radio interface. When a dynamic CN component of the PDB is used, see clause 5.7.3.4.
NOTE 7:
For Mission Critical services, it may be assumed that the UPF terminating No is located "close" to the 5G_AN (roughly 10 ms) and is not normally used in a long distance, home routed roaming situation. Hence delay of 10 ms for the delay between a UPF terminating N6 and a 5G AN should be subtracted from this PDB to derive the packet delay budget that applies to the radio interface.
NOTE 8:
In both RRC Idle and RRC Connected mode, the PDB requirement for these 5QIs can be relaxed (but not to a value greater than 320 ms) for the first packet(s) in a downlink data or signalling burst in order to permit reasonable battery saving (DRX) techniques.
NOTE 9:
It is expected that 5QI-65 and 5QI-69 are used together to provide Mission Critical Push to Talk service (e.g. 5QI-5 is not used for signalling). It is expected that the amount of traffic per UE will be similar or less compared to the IMS signalling.
NOTE 10:
In both RRC Idle and RRC Connected mode, the PDB requirement for these 5QIs can be relaxed for the first packet(s) in a downlink data or signalling burst in order to permit battery saving (DRX) techniques.
NOTE 11:
In RRC Idle mode, the PDB requirement for these 5QIs can be relaxed for the first packet(s) in a downlink data or signalling burst in order to permit battery saving (DRX) techniques.
NOTE 12:
This 5QI value can only be assigned upon request from the network side.
The UE and any application running on the UE is not allowed to request this 5QI value.
NOTE 13:
A delay of 20 ms for the delay between a UPF terminating N6 and a 5G-AN should be subtracted from a given PDB to derive the packet delay budget that applies to the radio interface.
NOTE 14:
This 5QI is not supported as it is only used for transmission of V2X messages over MBMS bearers as defined in TS 23.285 [72].
NOTE 15:
For "live" uplink streaming (see TS 26.238 |76]), guidelines for PDB values of the different 5QIs correspond to the latency configurations defined in TR 26.939 [77]. In order to support higher latency reliable streaming services (above 500 ms PDB), if different PDB and PER combinations are needed these configurations will have to use non-standardised 5QIs.

In Table 21, for example, it may known that 5QI value 82 is mapped to parameters in which a resource type is Delay Critical Guaranteed Bit Rate (GBR), a default priority level is 19, a packet delay budget is 10 ms, a packet error rate is $10^{-4}$, a default maximum data burst volume is 255 bytes, and/or the like.

In various embodiments of the disclosure, in order to indicate a priority of groupcast data or unicast data, a set of 5QI values which data which may be transmitted and received in a corresponding carrier or bandwidth part (BWP, hereinafter, referred to as "BWP") may have may be set together. For example, when configuring a specific BWP, it may be configured to transmit and receive data whose 5QI value is 1, 2, 4, 5, 6, 82, 83, and 84 in the corresponding BWP. In this case, data having a 5QI value other than eight 5QI values of {1, 2, 4, 5, 6, 82, 83, 84} may be regarded not to be transmitted and received in the corresponding BWP. At this time, a terminal transmitting control information, for example, DCI, in the corresponding BWP may include a 5QI field in the DCI.

For example, if it is configured that transmission and reception of data whose 5QI is 1, 2, 4, 5, 6, 82, 83, and 84 is performed in the corresponding BWP, 3 bits included in DCI may be used as a 5QI indicator indicating one of the 5QI values of {1, 2, 4, 5, 6, 82, 83, 84}. So, the terminal may receive configuration information for setting the 5QI value that data corresponding to BWP configuration may have. Meanwhile, a base station may determine a size of the 5QI indication field included in the DCI transmitted in the corresponding BWP. For example, if the configuration information indicating the 5QI value configures that the data transmitted through the corresponding BWP may correspond to one of N 5QI values, the 5QI indication field may have a size of $[\log_2 N]$, however, it should be noted that various embodiments of the disclosure are not necessarily limited thereto. The base station may transmit DCI including 5QI information based on the determined size of the 5QI indication field. The terminal receiving the DCI may interpret the 5QI indicator field included in the DCI, and thus may identify 5QI information applied to data scheduled via the DCI.

In various embodiments of the disclosure, while transmitting and receiving control information and data, a terminal may perform a specific operation based on a distance between a transmitter and a receiver or a distance from a reference location and a required communication distance condition of the transmitted and received data.

For example, in transmission and reception of groupcast data, the base station may include reference location information (e.g., an ID value of a zone which exists at a specific location) in DCI which is control information, also may include a reference distance value which is a transmission reference for HARQ feedback information (e.g., a reference zone ID, a reference distance, or a distance threshold value) in the DCI, and transmit the DCI.

Then, the terminal receiving the groupcast data decodes and receives the DCI transmitted from the base station, and identifies the reference location information and the distance value which is the transmission reference for the HARQ feedback information which are included in the DCI. The terminal (here, it should be noted that the term "terminal" may be used interchangeably with a receiver) receiving the DCI may determine whether to transmit HARQ feedback information to a transmitter, i.e., the base station based on the identified reference location information, the reference distance value, and the terminal's own location information. For example, if a distance difference between the reference location and the terminal's own location is greater than or equal to the reference distance value which is a criterion for whether to transmit the HARQ feedback information, the terminal does not transmit the HARQ feedback information. On the other hand, if the distance difference between the reference location and the terminal's own location is less than the reference distance value which is the criterion for whether to transmit the HARQ feedback information, the terminal transmits the HARQ feedback information for the groupcast data. The reference location may be a location of a specific transmitter or may be a location of the base station.

Meanwhile, the reference distance value may be described in a form of a distance value (Range Value) as follows. The distance value may be one of parameters indicating quality of service, i.e., QoS through a corresponding link.

The distance value, which may be one of the parameters indicating the QoS, may be interpreted as requiring a specific service to be performed or a specific type of data to be transmitted up to the corresponding distance value. For example, the distance value may be a criterion for a transmitter and a receiver to process a data packet. In various embodiments of the disclosure, a unit of the distance value may be, for example, a meter, and the transmitter and the receiver may receive maximum distance value information indicating a maximum distance value. This may mean that the terminal does not transmit and receive data having a distance value which is longer than the maximum distance value indicated by the maximum distance value information as a QoS parameter according to the received maximum distance value information. Here, the distance value is not limited to the above description and may be applied in various ways.

In addition, the reference distance value used to determine whether to transmit the HARQ feedback information may be determined according to data transmitted via a PDSCH, and the reference distance value may be a value transmitted together when the data is transmitted from a higher layer. The reference distance value may be transmitted by being included in DCI to schedule the PDSCH by the base station. That is, the PDSCH via which the data is transmitted may be scheduled via the DCI including the reference distance value for the data transmitted from the base station.

For example, the reference distance value may be indicated by the DCI in such a way that information directly indicating the reference distance value is included in the DCI, or an index indicating the reference distance value is included in the DCI. For example, any one of a total of n+1 index values up to 0, . . . , n may be included in the DCI, and an index value k may indicate a specific reference distance value (e.g., 100 m) or a range (e.g., a range of 100 m to 149 m) of the specific reference distance value. As another example, an index value indicating a zone ID of a zone indicating a specific area may be included in the DCI as information indicating the reference distance value.

In various embodiments of the disclosure, the data transmitted via the PDSCH may be transmitted in a TB form from a higher layer. One TB or two TBs may be transmitted on one PDSCH. Here, one TB may include various types of data. If multiple types of data having different reference distance values are included in one TB, there is a need for determining which reference distance value among the different reference distance values is to be included in DCI as a representative reference distance value.

In various embodiments of the disclosure, if various types of data having different reference distance values are included in one or more TBs, a representative reference distance value to be included in DCI may be determined based on any one of the following schemes.

A first scheme is a scheme of determining a maximum value or a minimum value among reference distance values for various types of data included in one TB as a representative reference distance value to be included in DCI. For example, a reference distance value having the maximum value among the reference distance values for the various types of data may be included in the DCI as the representative reference distance value. The representative reference distance value may be included in a distance value (Range Value) field included in the DCI, and in this case, the distance value field may be described as shown in Table 22 below.

TABLE 22

The UE shall set the "Range Value" field according to the largest range value among those range value(s) indicated by higher layers corresponding to the transport block.

In this way, a case that the reference distance value having the maximum value among the reference distance values for the various types of data included in the one TB is determined as the representative reference distance value may be to allow data which needs to be transmitted farthest from the reference location to be delivered.

Alternatively, a reference distance value having the minimum value among the reference distance values for the various types of data included in the one TB may be included in the DCI as the representative reference distance value, and in this case, the distance value field may be described as shown in Table 23 below.

TABLE 23

The UE shall set the Range Value field according to the smallest range value among those range value(s) indicated by higher layers corresponding to the transport block.

Also, in the above description, a case in which the reference distance value having the maximum value or the minimum value among the reference distance values for the various types of data included in the one TB is included in the DCI as the representative reference distance value has been described as an example, but one of the reference distance values for the various types of data as well as the maximum value or the minimum value may be included in the DCI as the representative reference distance value according to a situation, or a pair of the maximum value and the minimum value may be included in the DCI as the representative reference distance value. As such, if one TB includes data of several types with different reference distance values, a representative reference distance value included in a distance value (Range Value) field may be variously selected according to a situation, for example, it may be based on any way to be possible to increase efficiency for groupcast or multicast.

Meanwhile, in the above description, the reference distance value included in the distance value field has been described using a case that the one TB is delivered on the PDSCH as an example, but a similar scheme may be also applied if two TBs are delivered on the PDSCH. For example, a reference distance value having a maximum value among reference distance values of various types of data included in two TBs may be included in a distance value (Range Value field) of DCI, and this may be described as shown in Table 24 below.

TABLE 24

The UE shall set the "Range Value" field according to the largest range value among those range value(s) indicated by higher layers corresponding to the transport block(s).

Alternatively, it may be included in SCI having a minimum value among the reference distance values for the various types of data included in the two TBs.

Alternatively, the reference distance value having the minimum value among the reference distance values for the various types of data included in the one TB may be included as a representative reference distance value in DCI, and in this case, the distance value field may be described as shown in Table 25 below.

TABLE 25

The UE shall set the "Range Value" field according to the smallest range value among those range value(s) indicated by higher layers corresponding to the transport block(s).

In addition, in the above description, a case that the reference distance value having the maximum value or the minimum value among the reference distance values for the various types of data included in the two TBs is included in the DCI as the representative reference distance value is described, but one of the reference distance values for the various types of data as well as the maximum value or the minimum value may be included in the DCI as the representative reference distance value according to a situation, or a pair of the maximum value and the minimum value may be included in the DCI as the representative reference distance value. As such, if two TB include data of several types with different reference distance values, a representative reference distance value included in a distance value (Range Value) field may be variously selected according to a situation, for example, it may be based on any way to be possible to increase efficiency for groupcast or multicast.

Meanwhile, in the above description, a scheme of selecting a representative reference distance value among reference distance values for various types of data included in two TBs has been described, a scheme of selecting a representative reference distance value among reference distance values for various types of data included in three or more TBs may be also implemented similarly to the scheme of selecting the representative reference distance value among the reference distance values for the various types of data included in the two TBs. Next, if various types of data having different reference distance values are included in one or more TB, a second scheme of determining a representative reference distance value to be included in DCI will be described as follows.

In the second scheme, a criterion for selecting a representative reference distance value from among a plurality of reference distance values is set, any one of the plurality of reference distance values is selected based on the set criterion, and the selected reference distance value may be included in DCI. For example, the criterion for selecting the reference distance value to be included in a distance value (Range Value) field of the DCI may be set to a maximum value, a minimum value, an average value, and/or the like among reference distance values for various types of data, and a transmitter may select a reference distance value to be included in the DCI according to the criterion.

Third Embodiment

In the first embodiment of signal transmission/reception schemes for groupcast or multicast, a method and apparatus, in which terminals transmits, to a base station or a transmitter, HARQ feedback information if data for groupcast is transmitted to the terminals, have been described.

In addition, the second embodiment of signal transmission/reception schemes for groupcast or multicast has described a method and apparatus for what data terminals will receive and how to transmit HARQ feedback information for the received data if data for groupcast is transmitted to the terminals, and if the terminals are RRC_connected terminals, and the terminals receive data for unicast or broadcast along with the data for the groupcast.

Additionally, the third embodiment of signal transmission/reception schemes for groupcast or multicast provides a method and apparatus for receiving data according to a capability of RRC_connected terminals if groupcast data is transmitted to terminals, and if the terminals are the RRC_connected terminals.

A maximum data rate supported by a terminal in an NR system may be determined as follows, which has been described in detail in Equation 2, and when Equation 2 is described again, it is as follows.

data rate (in Mbps) =

$$10^{-6} \cdot \sum_{j=1}^{j} \left( v_{Layers}^{(j)} \cdot Q_m^{(j)} \cdot f^{(j)} \cdot R_{max} \cdot \frac{N_{PRB}^{BW(j),\mu} \cdot 12}{T_S^{\mu}} \cdot \left(1 - OH^{(j)}\right) \right)$$

That is, in Equation 2, the maximum data rate supported by the terminal in the NR system is described, and in Equation 2, J may represent the number of carriers bundled through carrier aggregation (CA), Rmax=948/1024, $$v_{Layers}^{(j)}$$

may represent a maximum number of layers, $$Q_m^{(j)}$$

may represent a maximum modulation order, $f^{(j)}$ may represent a scaling factor, and $\mu$ may represent subcarrier spacing. Here, $f^{(j)}$ as a value of one of 1, 0.8, 0.75, and 0.4, may be reported by the terminal, and $\mu$ may be given in a form of Table 14 as described above.

The maximum data rate of the terminal may be compared with an actual scheduled data rate so that scheduling is not performed more than a capability of the terminal at one time.

The terminal may determine the maximum data rate by calculating the maximum data rate according to a communication counterpart or by obtaining the maximum data rate based on a previously stored value. In addition, the terminal may use the determined maximum data rate for comparison with an actual instantaneous data rate. This comparing operation may be performed based on Equation 5 below.

In Equation 5 below, a left side of an inequality sign represents an instantaneous data rate of scheduled data, and DataRateCC on a right side of the inequality sign represents a maximum data rate in a corresponding serving cell of the terminal (which may be determined according to a capability of the terminal). Based on the DataRateCC in Equation 5, a corresponding value may be used depending on whether the scheduling is for transmission and reception between the terminal and the base station, such as a PDSCH or a PUSCH, or for transmission and reception between the terminal and another terminal, such as a PSSCH.

$$\frac{\sum_{m=0}^{M-1} V_{j,m}}{L \times T_S^{\mu}} \le DataRateCC \qquad \text{[Equation 5]}$$

In Equation 5, L denotes the number of OFDM symbols allocated to a PDSCH or PSSCH, and M denotes the number of TBs transmitted in the corresponding PDSCH or PSSCH. In Equation 5, L may also include the number of symbols for automatic gain control (AGC, hereinafter, referred to as "AGC") transmitted by a terminal in a sidelink. In Equation 5, $$T_S^{\mu}$$

may be expressed as Equation 6 below.

$$T_S^{\mu} = \frac{10^{-3}}{2^{\mu} \cdot N_{symb}^{slot}} \qquad \text{[Equation 6]}$$

In addition, in Equation 5, $\mu$ denotes subcarrier spacing used for transmission of a PDSCH or PSSCH.

Also, in the m-th TB, $V_{j,m}$ in Equation 5 may be expressed as Equation 7 below.

$$V_{j,m} = C' \cdot \left\lfloor \frac{A}{C} \right\rfloor \qquad \text{[Equation 7]}$$

In Equation 7, A denotes a size of a TB (a transport block size (TBS), hereinafter, referred to as "TBS"), C denotes the number of code blocks (CBs) included in the TB, and C' denotes the number of code blocks scheduled in the corresponding TB. In addition, in a case of code block group (CBG) retransmission, C and C' may be different. In addition, in Equation 7, $\lfloor x \rfloor$ denotes a maximum integer not greater than x.

In the above, DataRateCC denotes a maximum data rate supported by the terminal in a corresponding carrier or serving cell, and may be determined as shown in Equation 5 above.

Alternatively, the maximum data rate supported by the terminal may be expressed as Equation 8 below.

[Equation 8]

data rate (in Mbps) =

$$10^{-6} \cdot v_{Layers}^{(j)} \cdot Q_m^{(j)} \cdot f^{(j)} \cdot R_{max} \cdot \frac{N_{PRB}^{BW(j),\mu} \cdot 12}{T_S^{\mu}} \cdot \left(1 - OH^{(j)}\right)$$

Equation 8 is an equation showing an example of calculating the maximum data rate DataRateCC supported by the terminal in the $j^{th}$ serving cell.

In Equation 8, $R_{max}$=948/1024, $$Q_m^{(j)}$$

may denote a maximum modulation order, $f^{(j)}$ may denote a scaling index, and may denote subcarrier spacing. Here, $f^{(j)}$ as a value of one of 1, 0.8, 0.75, and 0.4, may be reported by the terminal, and may be given in a form of Table 8 as described above.

Also, in Equation 8, $$T_S^{\mu}$$

may denote an average OFDM symbol length, $$T_S^{\mu}$$

may be expressed as $$\frac{10^{-3}}{14 \cdot 2^{\mu}},$$

and $$N_{PRB}^{BW(j),\mu}$$

denotes the maximum number of RBs in BW(j).

In addition, in Equation 8, $OH^{(j)}$ may represent an overhead value, and it may be given as 0.14 in a downlink of FR1 (band lower than or equal to 6 GHz), may be given as 0.18 in an uplink of the FR1, may be given as 0.08 in a downlink of FR2 (band above 6 GHz), and may be given as 0.10 in an uplink of the FR2.

Meanwhile, in various embodiments of the disclosure, transmission of groupcast data and unicast data may be considered in a calculating operation based on Equation 5 as follows.

(1) Method B1

This is a method of considering scheduling for groupcast data as well as scheduling for unicast data in calculation of a left side in Equation 5. That is, the left side in Equation 5 represents an instantaneous data rate of scheduled data, and at this time, the instantaneous data rate of the scheduled data is detected by considering not only the unicast data but also the groupcast data.

(2) Method B2

This is a method of considering scheduling for groupcast data for which transmission of HARQ feedback information is enabled as well as scheduling for unicast data in calculation of a left side in Equation 5. That is, the left side in Equation 5 represents an instantaneous data rate of scheduled data, and at this time, the instantaneous data rate of the scheduled data is detected by considering not only the unicast data but also the groupcast data for which the transmission of the HARQ feedback information is enabled.

(3) Method B3

This is a method of considering scheduling for groupcast data which is scheduled using an RNTI value for specific groupcast for a RRC_connected terminal as well as scheduling for unicast data in calculation of a left side in Equation 5. That is, the left side in Equation 5 represents an instantaneous data rate of scheduled data, and at this time, the instantaneous data rate of the scheduled data is detected by considering not only the unicast data but also the groupcast data which is scheduled using the RNTI value for the specific groupcast for the RRC_connected terminal.

(4) Method B4

This is a method of considering scheduling for groupcast data which is configured via higher layer signaling or groupcast data which is scheduled using a HARQ process ID which is configured via higher layer signaling as well as scheduling for unicast data in calculation of a left side in Equation 5. That is, the left side in Equation 5 represents an instantaneous data rate of scheduled data, and at this time, the instantaneous data rate of the scheduled data is detected by considering not only the unicast data but also the groupcast data which is configured via the higher layer signaling or the groupcast data which is scheduled using the HARQ process ID which is configured via the higher layer signaling.

A structure of a base station according to embodiments of the disclosure will be described with reference to FIG. 12.

Figure 12:
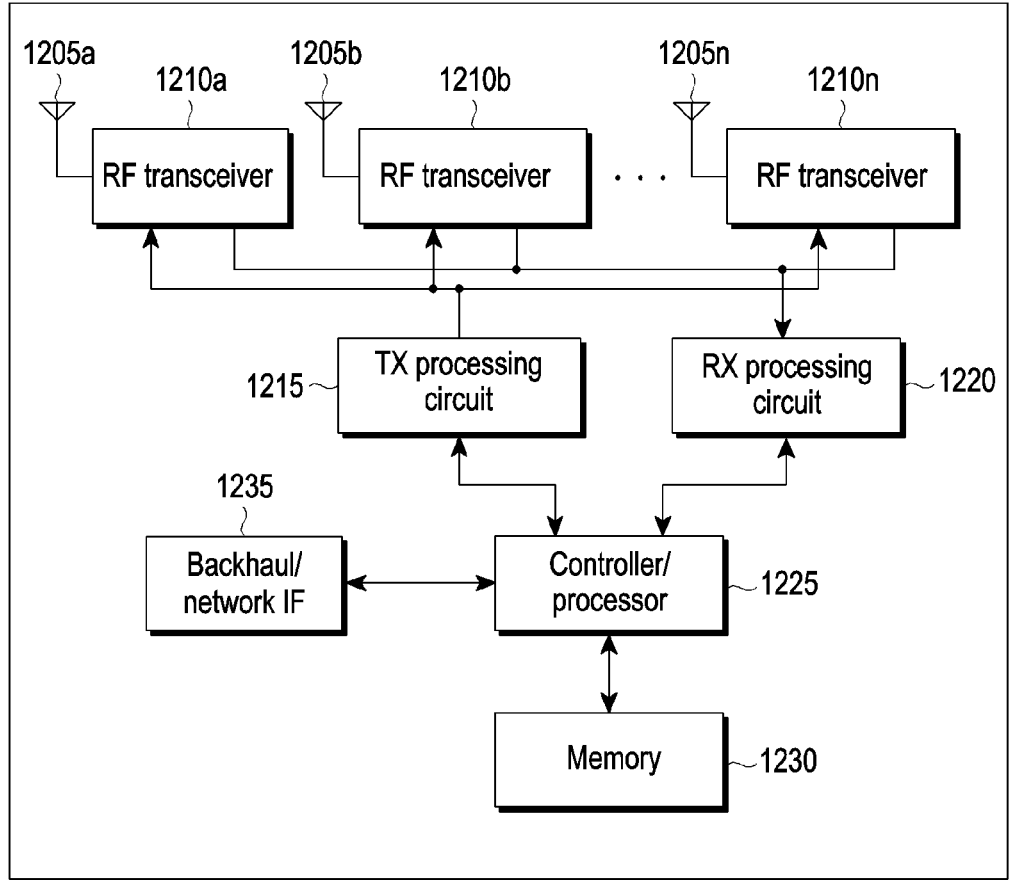
FIG. 12 is a diagram schematically illustrating an inner structure of an example base station according to embodiments of the disclosure.

FIG. 12 is a diagram schematically illustrating a structure of an example base station according to embodiments of the disclosure. An embodiment of the base station illustrated in FIG. 12 is for illustrative purposes only, so FIG. 12 does not limit the scope of the disclosure to any particular implementation of the base station.

As described in FIG. 12, the base station includes a plurality of antennas 1205a to 1205n, a plurality of RF transceivers 1210a to 1210n, a transmit (TX) processing circuit 1215, and a receive (RX) processing circuit 1220.

The base station further includes a controller/processor 1225, a memory 1230, and a backhaul or network interface 1235.

The RF transceivers 1210a to 1210n receive input RF signals, such as signals transmitted from terminals in a network, from the antennas 1205a to 1205n. The RF transceivers 1210a to 1210n down-convert the input RF signals to generate intermediate frequency (IF) or baseband signals. The IF or baseband signals are transmitted to the RX processing circuit 1220, and the RX processing circuit 1220 filters, decodes, and/or digitizes the baseband or IF signals to generate processed baseband signals. The RX processing circuit 1220 transmits the processed baseband signals to the controller/processor 1225 for further processing.

The TX processing circuit 1215 receives analog or digital data (such as speech data, web data, emails, or interactive video game data) from the controller/processor 1225. The TX processing circuit 1215 encodes, multiplexes, and/or digitizes the output baseband data to generate processed baseband or IF signals. The RF transceivers 1210a to 1210n receive the processed baseband or IF signals outputted from the TX processing circuit 1215 and up-convert the baseband or IF signals into RF signals which are to be transmitted through the antennas 1205a to 1205n.

The controller/processor 1225 may include one or more processors or other processing devices that control the overall operation of the base station. For example, the controller/processor 1225 may control reception of forward channel signals and transmission of reverse channel signals by the RF transceivers 1210a to 1210n, the processing circuit 1220, and the TX processing circuit 1215 according to known principles. The controller/processor 1225 may support additional functions, such as more advanced wireless communication functions.

In various embodiments of the disclosure, the controller/processor 1225 performs an overall operation related to signal transmission/reception schemes for groupcast or multicast. In particular, in the first embodiment of signal transmission/reception schemes for groupcast or multicast, the controller/processor 1225 performs an overall operation related to a method for supporting terminals to transmit HARQ feedback information to the base station or a transmitter if data for the groupcast is transmitted to the terminals.

Further, in the second embodiment of the signal transmission/reception schemes for the groupcast or the multicast, the controller/processor 1225 performs an overall operation related to a method for what data the terminals will receive and how to transmit HARQ feedback information for the received data if the data for the groupcast is transmitted to the terminals, and if the terminals are RRC_connected terminals, and the terminals receive data for unicast or broadcast along with the data for the groupcast.

Additionally, in the third embodiment of the signal transmission/reception schemes for the groupcast or the multicast, the controller/processor 1225 performs an overall operation related to a method for receiving data according to capabilities of RRC_connected terminals if groupcast data is transmitted to terminals and the terminals are the RRC_connected terminals.

Further, the controller/processor 1225 may support beamforming or directional routing operations in which signals outputted from the plurality of antennas 1205a to 1205n are differently weighted to efficiently steer the signals outputted in a desired direction. Any of other various functions may be supported by the controller/processor 1225 in the base station.

The controller/processor 1225 may also execute programs and other processes such as an operating system (OS), which are resident in the memory 1230. The controller/processor 1225 may move data as required by a running process to the memory 1230 or the outside of the memory 1230.

The controller/processor 1225 is connected with the backhaul or network interface 1235. The backhaul or network interface 1235 allows the base station to communicate with other devices or systems through a backhaul connection or through a network. The interface 1235 may support communications through any appropriate wired or wireless connection(s). For example, when the base station is implemented as a part of a cellular communication system (such as a cellular communication system supporting 5G, LTE, or LTE-A), the interface 1235 may allow the base station to communicate with other base stations through a wired or wireless backhaul connection. When the base station is implemented as an access point, the interface 1235 may allow the base station to communicate with a larger network (such as the Internet) through a wired or wireless local area network or a wired or wireless connection. The interface 1235 includes an appropriate structure to support communications through a wired or wireless connection, such as Ethernet or an RF transceiver.

The memory 1230 is connected to the controller/processor 1225. A portion of the memory 1230 may include a RAM, and another portion of the memory 1230 may include a flash memory or another ROM.

Although FIG. 12 illustrates an example of a base station, various changes may be made to FIG. 12. For example, the base station may include any number of such components as illustrated in FIG. 12. As a specific example, an access point may include a plurality of interfaces 1235, and the controller/processor 1225 may support routing functions to route data between different network addresses. As another specific example, although FIG. 12 illustrates that the base station includes a single instance of the TX processing circuit 1215 and a single instance of the RX processing circuit 1220, the base station may include multiple instances (e.g., one for each RF transceiver). Various components of FIG. 12 may be combined together, or each component may be further divided or some components may be omitted or, as necessary, more components may be added.

A structure of a UE according to embodiments of the disclosure will be described with reference to FIG. 13.

Figure 13:
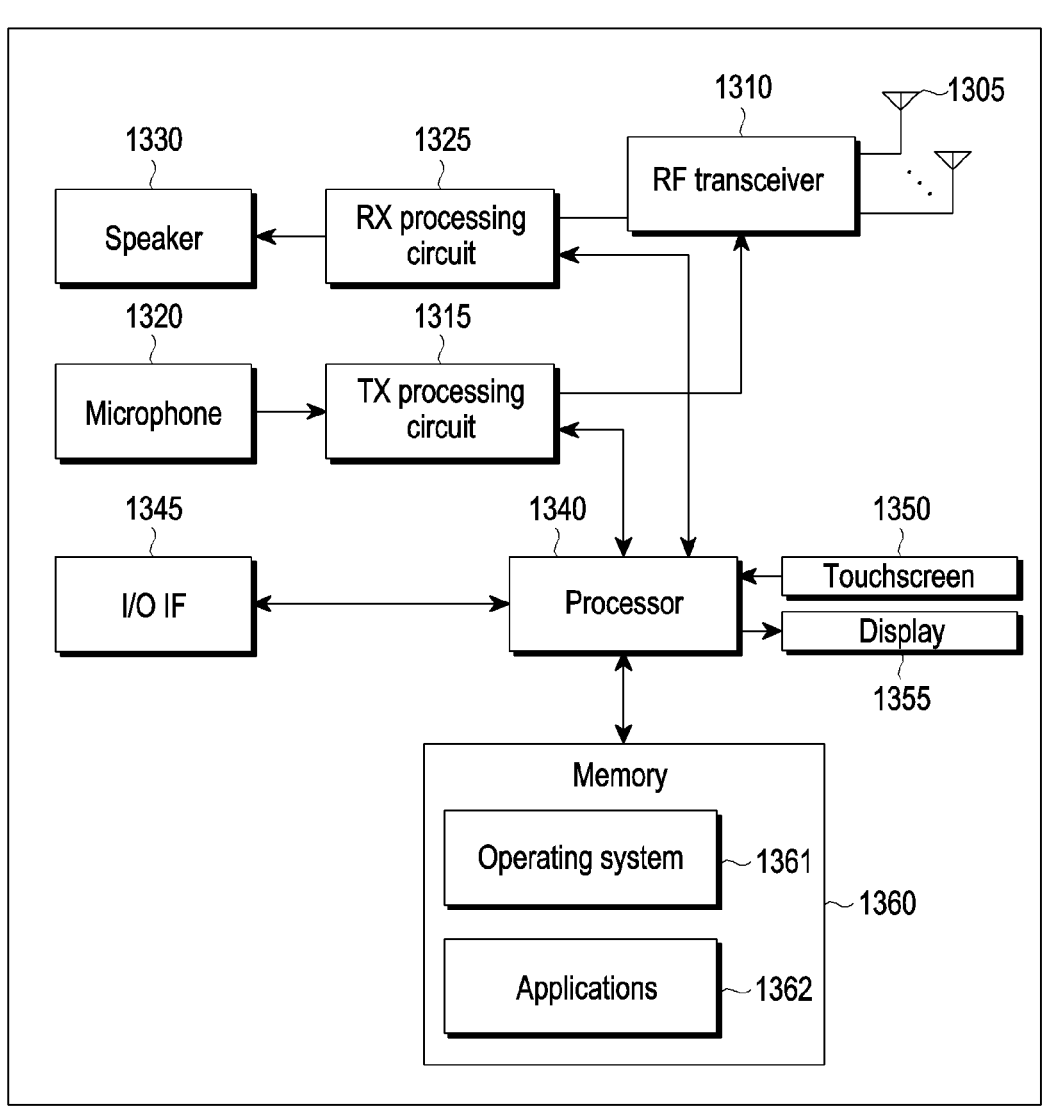
FIG. 13 is a diagram schematically illustrating an inner structure of an example terminal according to embodiments of the disclosure.

FIG. 13 is a diagram schematically illustrating a structure of an example terminal according to embodiments of the disclosure.

An embodiment of a terminal illustrated in FIG. 13 is for illustrative purposes only, and FIG. 13 does not limit the scope of the disclosure to any particular implementation.

As illustrated in FIG. 13, the terminal may include an antenna 1305, a radio frequency (RF) transceiver 1310, a transmit (TX) processing circuit 1315, a microphone 1320, and a receive (RX) processing circuit 1325. The terminal further includes a speaker 1330, a processor 1340, an input/output (I/O) interface (IF) 1345, a touch screen 1350, a display 1355, and a memory 1360. The memory 1360 includes an operating system (OS) 1361 and one or more applications 1362.

The RF transceiver 1310 receives an input RF signal transmitted from a base station in a network, from the antenna 1305. The RF transceiver 1310 down-converts the input RF signal to generate an intermediate frequency (IF) or baseband signal. The IF or baseband signal is transmitted to the RX processing circuit 1325, and the RX processing circuit 1325 filters, decodes, and/or digitizes the baseband or IF signal to generate a processed baseband signal. The RX processing circuit 1325 transmits the processed baseband signal to the speaker 1330 (e.g., for speech data) or the processor 1340 (e.g., for web browsing data) for further processing.

The TX processing circuit 1315 receives analog or digital speech data from the microphone 1320 or other output baseband data (e.g., web data, emails, or interactive video game data) from the processor 1340. The TX processing circuit 1315 encodes, multiplexes, and/or digitizes the output baseband data to generate a processed baseband or IF signal. The RF transceiver 1310 receives the processed baseband or IF signal outputted from the TX processing circuit 1315 and up-converts the baseband or IF signal into an RF signal which is to be transmitted via the antenna 1305.

The processor 1340 may include one or more processors or other processing devices, and may execute the OS 1361 stored in the memory 1360 to control an overall operation of the terminal. For example, the processor 1340 may control reception of downlink channel signals and transmission of uplink channel signals by the RF transceiver 1310, the RF processing circuit 1325, and the TX processing circuit 1315 according to known principles. In some embodiments, the processor 1340 includes at least one microprocessor or microcontroller.

In various embodiments of the disclosure, the processor 1340 performs an overall operation related to signal transmission/reception schemes for groupcast or multicast. In particular, in the first embodiment of signal transmission/reception schemes for groupcast or multicast, the processor 1340 performs an overall operation related to a method for supporting terminals to transmit HARQ feedback information to the base station or a transmitter if data for the groupcast is transmitted to the terminals.

Further, in the second embodiment of the signal transmission/reception schemes for the groupcast or the multicast, the processor 1340 performs an overall operation related to a method for what data the terminals will receive and how to transmit HARQ feedback information for the received data if the data for the groupcast is transmitted to the terminals, and if the terminals are RRC_connected terminals, and the terminals receive data for unicast or broadcast along with the data for the groupcast.

Additionally, in the third embodiment of the signal transmission/reception schemes for the groupcast or the multicast, the processor 1340 performs an overall operation related to a method for receiving data according to capabilities of RRC_connected terminals if groupcast data is transmitted to terminals and the terminals are the RRC_connected terminals.

The processor 1340 may execute other processes and programs embedded in the memory 1360, such as processes for CSI feedback on the uplink channel. The processor 1340 may move data into or out of the memory 1360 as required by a running process. In some embodiments, the processor 1340 is configured to execute the applications 1362 based on the OS program 1361 or in response to signals received from base stations or the operator. The processor 1340 is coupled to the I/O interface 1345, and the I/O interface 1345 provides the terminal with connectability to other devices such as laptop computers and handheld computers. The I/O interface 1345 is a communication path between these accessories and the processor 1340.

The processor 1340 is also connected to the touch screen 1350 and the display unit 1355. The operator of the terminal may input data into the terminal using the touch screen 1350. The display 1355 may be a liquid crystal display, a light emitting diode display, or other displays capable of rendering text and/or at least limited graphics, such as from websites.

The memory 1360 is connected to the processor 1340. A portion of the memory 1360 may include a random access memory (RAM), and the remainder of the memory 1360 may include a flash memory or another read-only memory (ROM).

Although FIG. 13 illustrates an example of a terminal, various changes may be made to FIG. 13. For example, various components of FIG. 13 may be combined together, each component may be further divided, or some components may be omitted, or other components may be added as necessary. As an example, the processor 1340 may be divided into multiple processors, such as one or more central processing units (CPUs) and one or more graphics processing units (GPUs). Although the terminal is configured like a mobile phone or a smart phone in FIG. 13, the terminal may be configured to operate as different types of mobile or fixed devices.

Each of a terminal and a base station for carrying out embodiments of the disclosure may include a transmitter, a receiver, and a processor.

For transmitting groupcast control information and unicast control information, and groupcast data and unicast data in embodiments of the disclosure, the transmitter, the receiver, and the processor in each of the base station and the terminal needs to operate according to each embodiment as described above. If embodiments of the disclosure are applied to data transmission/reception in a sidelink, the base station may be a terminal performing transmission in the sidelink or may be a general base station. In addition, the terminal may be a terminal that performs transmission or reception in the sidelink.

An inner structure of a terminal according to embodiments of the disclosure will be described with reference to FIG. 14.

Figure 14:
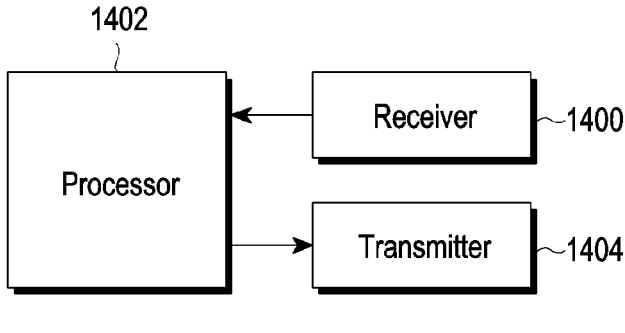
FIG. 14 is a block diagram schematically illustrating an inner structure of a terminal according to embodiments of the disclosure.

FIG. 14 is a block diagram schematically illustrating an inner structure of a terminal according to embodiments of the disclosure.

As described in FIG. 14, the terminal may include a receiver 1400, a transmitter 1404, and a processor 1402. In according to embodiments of the disclosure, the receiver 1400 and the transmitter 1404 may collectively be referred to as a transceiver. The transceiver may transmit/receive a signal to/from the base station. The signal may include control information and data. To that end, the transceiver may include an RF transmitter for frequency-up converting and amplifying a transmitted signal, an RF receiver for low-noise amplifying and frequency-down converting a received signal, and/or the like. The transceiver may receive a signal via a radio channel, output the signal to the processor 14, and transmit a signal outputted from the processor 14 via a radio channel. The processor 14 may control a series of processes for the terminal to operate according to the above-described embodiments of the disclosure.

An inner structure of a base station according to embodiments of the disclosure will be described with reference to FIG. 15.

Figure 15:
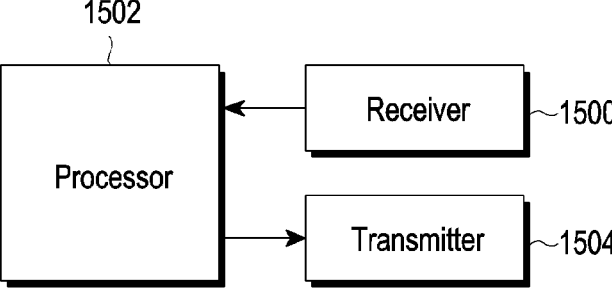
FIG. 15 is a block diagram schematically illustrating an inner structure of a base station according to embodiments of the disclosure.

FIG. 15 is a block diagram schematically illustrating an inner structure of a base station according to embodiments of the disclosure.

As described in FIG. 15, the base station may include a receiver 1501, a transmitter 1505, and a processor 1503. In embodiments of the disclosure, the receiver 1501 and the transmitter 1505 may collectively be referred to as a transceiver. The transceiver may transmit/receive a signal to/from a terminal. The signal may include control information and data. To that end, the transceiver may include an RF transmitter for frequency-up converting and amplifying transmitted a signal, an RF receiver for low-noise amplifying and frequency-down converting a received signal, and/or the like. The transceiver may receive a signal via a radio channel, output the signal to the processor 1503, and transmit a signal outputted from the processor 1503 via a radio channel. The base station processor 1503 may control a series of processes for the base station to be able to operate according to the above-described embodiments of the disclosure.

Embodiments of the disclosure disclosed in the specification and the drawings are provided merely for better understanding of the disclosure, and the disclosure should not be limited thereto or thereby. In other words, it is apparent to one of ordinary skill in the art that various changes may be made thereto without departing from the scope of the disclosure. Further, embodiments of the disclosure may be practiced in combination. For example, the first embodiment and the second embodiment may be combined and applied. Embodiments of the disclosure may be changed or modified based on their technical spirit and applied to an LTE system, a 5G system, and/or the like.

Although the disclosure has been described in connection with an example embodiment, various changes or modifications may be made thereto and proposed to one of ordinary skill in the art. Such changes or modifications are intended as belonging to the scope of the appended claims. None of the elements, processes, or functions described herein should be interpreted as essential elements that should be included in the scope of the claims. The scope of the subject matter is defined by the claims.

The invention claimed is:

1. A method performed by a transmitting apparatus in a wireless communication system, the method comprising:
   transmitting first control information related to multicast including a first priority value;
   transmitting second control information related to unicast including a second priority value;
   transmitting first data based on the first control information;
   transmitting second data based on the second control information; and
   receiving feedback data based on one of the first control information and the second control information,
   wherein the first control information includes:
      information indicating a reference location,
      information indicating a threshold distance, and
      information having a first value or a second value,
         wherein the first value indicates that, in case that a distance of a receiving apparatus from the reference location is less than the threshold distance, the receiving apparatus performs feedback for the multicast, and the second value indicates that, in case that the distance of the receiving apparatus from the reference location is greater than or equal to the threshold distance, the receiving apparatus performs feedback for the multicast.

2. The method of claim 1, wherein the first control information is related to hybrid automatic repeat request (HARQ) feedback for multicast.

3. The method of claim 1, wherein the feedback data is related to hybrid automatic repeat request (HARQ) feedback.

4. The method of claim 1, wherein, in case that the feedback data is based on the first control information, other feedback data is not received based on the second control information.

5. The method of claim 1, wherein the second control information is related to hybrid automatic repeat request (HARQ) feedback for unicast.

6. A method performed by a receiving apparatus in a wireless communication system, the method comprising:

receiving first control information related to multicast including a first priority value;

receiving second control information related to unicast including a second priority value;

receiving first data based on the first control information;

receiving second data based on the second control information; and transmitting feedback data based on one of the first control information and the second control information, wherein the first control information includes:

information indicating a reference location, information indicating a threshold distance, and information having a first value or a second value, wherein the first value indicates that, in case that a distance of the receiving apparatus from the reference location is less than the threshold distance, the receiving apparatus performs feedback for the multicast, and the second value indicates that, in case that the distance of the receiving apparatus from the reference location is greater than or equal to the threshold distance, the receiving apparatus performs feedback for the multicast.

7. The method of claim 6, wherein the first control information is related to hybrid automatic repeat request (HARQ) feedback for multicast.

8. The method of claim 6, wherein the feedback data is related to hybrid automatic repeat request (HARQ) feedback.

9. The method of claim 6, wherein, in case that the feedback data is based on the first control information, other feedback data is not received based on the second control information.

10. The method of claim 6, wherein the second control information is related to hybrid automatic repeat request (HARQ) feedback for unicast.

11. A transmitting apparatus in a wireless communication system, the transmitting apparatus comprising:

a transceiver; and at least one processor coupled to the transceiver and configured to:

transmit first control information related to multicast including a first priority value, transmit second control information related to unicast including a second priority value, transmit first data based on the first control information;

transmit second data based on the second control information; and receive feedback data based on one of the first control information and the second control information, wherein the first control information includes:

information indicating a reference location, information indicating a threshold distance, and information having a first value or a second value, wherein the first value indicates that, in case that a distance of a receiving apparatus from the reference location is less than the threshold distance, the receiving apparatus performs feedback for the multicast, and the second value indicates that, in case that the distance of the receiving apparatus from the reference location is greater than or equal to the threshold distance, the receiving apparatus performs feedback for the multicast.

12. The transmitting apparatus of claim 11, wherein the first control information is related to hybrid automatic repeat request (HARQ) feedback for multicast.

13. The transmitting apparatus of claim 11, wherein the feedback data is related to hybrid automatic repeat request (HARQ) feedback.

14. The transmitting apparatus of claim 11, wherein, in case that the feedback data is based on the first control information, other feedback data is not received based on the second control information.

15. The transmitting apparatus of claim 11, wherein the second control information is related to hybrid automatic repeat request (HARQ) feedback for unicast.

16. A receiving apparatus in a wireless communication system, the receiving apparatus comprising:

a transceiver; and at least one processor coupled to the transceiver and configured to:

receive first control information related to for multicast including a first priority value, receive second control information related to unicast including a second priority value, receive first data based on the first control information, receive second data based on the second control information, and transmit feedback data based on one of the first control information and the second control information, wherein the first control information includes:

information indicating a reference location, information indicating a threshold distance, and information having a first value or a second value, wherein the first value indicates that, in case that a distance of the receiving apparatus from the reference location is less than the threshold distance, the receiving apparatus performs feedback for the multicast, and the second value indicates that, in case that the distance of the receiving apparatus from the reference location is greater than or equal to the threshold distance, the receiving apparatus performs feedback for the multicast.

17. The receiving apparatus of claim 16, wherein the first control information is related to hybrid automatic repeat request (HARQ) feedback for multicast.

18. The receiving apparatus of claim 16, wherein the feedback data is related to hybrid automatic repeat request (HARQ) feedback.

19. The receiving apparatus of claim 16, wherein the second control information is related to hybrid automatic repeat request (HARQ) feedback for unicast.

20. The receiving apparatus of claim 16, wherein, in case that the feedback data is based on the first control information, other feedback data is not received based on the second control information.

* * * * *